US008706029B2

(12) United States Patent
Washiro

(10) Patent No.: US 8,706,029 B2
(45) Date of Patent: Apr. 22, 2014

(54) COMMUNICATION SYSTEM AND COMMUNICATION APPARATUS

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 450 days.

(21) Appl. No.: 12/138,803

(22) Filed: Jun. 13, 2008

(65) Prior Publication Data

US 2008/0311849 A1 Dec. 18, 2008

(30) Foreign Application Priority Data

Jun. 14, 2007 (JP) ................................ P2007-157906

(51) Int. Cl.
*H04B 5/00* (2006.01)

(52) U.S. Cl.
USPC ........................................................ 455/41.1

(58) Field of Classification Search
USPC ........................................................ 455/41.1
See application file for complete search history.

(56) References Cited

U.S. PATENT DOCUMENTS

| | | | | |
|---|---|---|---|---|
| 6,323,811 | B1 * | 11/2001 | Tsubaki et al. | 343/700 MS |
| 6,356,244 | B1 * | 3/2002 | Mizuno et al. | 343/895 |
| 7,519,328 | B2 * | 4/2009 | Dokai et al. | 455/41.2 |
| 2004/0075616 | A1 * | 4/2004 | Endo et al. | 343/895 |
| 2006/0202269 | A1 * | 9/2006 | Suzuki et al. | 257/347 |
| 2006/0266435 | A1 * | 11/2006 | Yang et al. | 148/105 |
| 2007/0004363 | A1 * | 1/2007 | Kusaka et al. | 455/269 |
| 2007/0095913 | A1 * | 5/2007 | Takahashi et al. | 235/451 |

FOREIGN PATENT DOCUMENTS

| | | |
|---|---|---|
| JP | 1-198836 | 8/1989 |
| JP | 6-260815 | 9/1994 |
| JP | 9-18393 | 1/1997 |
| JP | 2004-214879 | 7/2004 |
| JP | 2004-341895 | 12/2004 |
| JP | 2005-18671 | 1/2005 |
| JP | 2006-60283 | 3/2006 |
| JP | 2006-106612 | 4/2006 |
| JP | 2007-68123 | 3/2007 |

OTHER PUBLICATIONS

Tasuku Teshirogi et al., "Modern Millimeter-Wave Technologies", Ohmsha, pp. 119.
Akitoshi Toshimi, "A Study of Surface Wave Propagating Two Parallel Ferrite Rods", Shizuoka University.
Mushiake Yasuto, "Antenna, Radio Wave Propagation" Coronasha, pp. 16-18.
Masamitsu Nakajima, "Microwave Engineering", Morikita Publishing Company, p. 182-190.
Office Action issued by the Japanese Patent Office in counterpart Application No. JP 2008-216229, dated May 22, 2012.

* cited by examiner

*Primary Examiner* — David Bilodeau
(74) *Attorney, Agent, or Firm* — Finnegan, Henderson, Farabow, Garrett & Dunner, L.L.P.

(57) ABSTRACT

A communication system includes a transmitter including a transmitting circuit to generate radio frequency signals for transmitting data and an electrical field coupling antenna to transmit the radio frequency signals as an electrostatic field or an inductive electrical field; and a receiver including an electrical field coupling antenna and a receiving circuit to perform a reception process on radio frequency signals received by the electrical field coupling antenna. Each of the electrical field coupling antennas of the transmitter and the receiver includes a coupling electrode, a resonant portion to strengthen electrical coupling between the coupling electrodes, and a radio wave absorber placed near the coupling electrode. The radio frequency signals are transmitted through electrical field coupling between the electrical field coupling antennas facing each other of the transmitter and the receiver.

14 Claims, 15 Drawing Sheets

COMMUNICATION SYSTEM AND COMMUNICATION APPARATUS

CROSS REFERENCES TO RELATED APPLICATIONS

The present invention contains subject matter related to Japanese Patent Application JP 2007-157906 filed in the Japanese Patent Office on Jun. 14, 2007, the entire contents of which are incorporated herein by reference.

BACKGROUND OF THE INVENTION

1. Field of the Invention

The present invention relates to a communication system and a communication apparatus allowing information apparatuses to perform large-volume data communication. Particularly, the present invention relates to a communication system and a communication apparatus allowing information apparatuses to perform data communication by using an electrostatic field or an inductive electrical field without causing interference with another communication system. Also, the present invention relates to a communication system and a communication apparatus allowing information apparatuses to perform data communication by using an inductive magnetic field without causing interference with another communication system.

More specifically, the present invention relates to a communication system and a communication apparatus allowing information apparatuses placed in a short range to transmit radio frequency (RF) signals by using an electrostatic field or an inductive electrical field. Also, the present invention relates to a communication system and a communication apparatus allowing information apparatuses placed in a short range to transmit RF signals by using an inductive magnetic field. Particularly, the present invention relates to a communication system and a communication apparatus allowing couplers mounted on respective information apparatuses to efficiently transmit RF signals so as to enable large-volume transmission in a short range using electrical field coupling or magnetic field coupling.

2. Description of the Related Art

Recently, a radio interface has been used more instead of a multi-purpose cable such as an AV (audio visual) cable or a USB (universal serial bus) cable and a medium such as a memory card in order to transfer data from a compact information apparatus to another, for example, to exchange image data or music data between personal computers. Using the radio interface eliminates the need for connecting a cable to a connector at every data transmission, which is convenient for a user. Also, many information apparatuses provided with various cableless communication functions have emerged. As a method for performing cableless data transmission between compact apparatuses, a radio wave communication method for transmitting/receiving radio signals by using an antenna, such as communication using a radio LAN (local area network) represented by IEEE802.11 or Bluetooth®, has been developed.

A communication method called "ultrawideband (UWB)", which has been receiving attention in recent years, is a radio communication technique that uses a very wide frequency band of 3.1 GHz to 10.6 GHz and that realizes large-volume data radio transmission of about 100 Mbps in a short range. Thus, the UWB communication method is capable of transferring large-volume data, for example, moving pictures and music data of a CD (compact disc), at high speed and in short time.

The UWB communication, of which communication distance is about 10 m due to transmission power, is used for radio communication in a short range, such as a PAN (personal area network). For example, a method for transmitting data having a packet structure including a preamble has been devised as an access control method of UWB communication in IEEE2802.15.3 and the like. Also, Intel Corporation in the United States has been considering a wireless version of the USB, widespread as a multi-purpose interface for a personal computer, as an application of the UWB.

Also, a transmission system using a UWB low-band of 3.1 to 4.9 GHz has been actively developed under consideration that the UWB communication enables data transmission of over 100 Mbps without occupying a transmission band of 3.1 GHz to 10.6 GHz and that an RF circuit can be easily made.

Under the Radio Law in Japan, weak radio waves having an electrical field intensity (radio wave intensity) of a predetermined level or lower at a distance of three meters from radio facilities, that is, weak radio waves of a noise level for a neighboring radio system, do not require a license of a radio station, so that development and manufacturing costs of radio systems can be reduced. By applying the above-described UWB communication, a short-range radio communication system can be constituted at a relatively low electrical field level based on its transmission power. However, if a UWB communication system is constituted by using a radio wave communication method of transmitting/receiving radio signals by using an antenna, it is difficult to suppress a generated electrical field to a weak level.

Many of radio communication systems according to related arts adopt the radio wave communication method, in which signals are propagated by using a radiated electrical field that is generated when a current is flown to an aerial (antenna). In this case, a transmitter side emits radio waves regardless of presence/absence of a receiver side, and thus may become a source of disturbing radio waves to a neighboring communication system disadvantageously. Also, an antenna on a receiver side receives not only desired waves from a transmitter but also radio waves coming from a remote site, and is thus subject to external disturbing radio waves, which results in a decrease in reception sensitivity. If there are a plurality of other ends of communication, complicated setting is performed to select desired one from among the other ends. For example, when a plurality of pairs of radio apparatuses perform radio communication in a narrow range, division multiplexing including selection of frequencies is performed to avoid mutual interference. Furthermore, polarized waves orthogonal to each other prevent communication from being performed, and thus the directions of polarized waves of antennas should be matched with each other between a transmitter and a receiver.

For example, in a noncontact data communication system in an extremely short range of several millimeters to several centimeters, it is preferred that a transmitter and a receiver strongly couple to each other in a short range while that signals do not reach a remote site so that interference with another system can be avoided. Also, it is desired that apparatuses performing data communication couple with each other while being independent from each other's attitude (orientation), that is, without directivity, when the apparatuses are close to each other. Also, it is desired that wideband communication is possible when large-volume data communication is performed.

Other than the above-described radio wave communication using a radiated electrical field, communication methods using an electrostatic field or an inductive electrical field are used in radio communication. For example, in an existing noncontact communication system mainly used in RFID (radio frequency identification), electrical field coupling or electromagnetic induction is applied. An electrostatic field and an inductive electrical field are inversely proportional to the third power and the square of the distance from a source, respectively. Thus, the electrostatic field and the inductive electrical field can realize weak radio waves having an electrical field intensity (radio wave intensity) of a predetermined level or lower at a distance of three meters from radio facilities, and a license of a radio station is not required. In this type of noncontact communication system, transmitted signals steeply attenuate in accordance with a distance, and thus no coupling occurs when no other end for communication exists in the neighborhood. Accordingly, any communication system is not disturbed. Furthermore, even if radio waves come from a remote site, a coupler does not receive the radio waves, and thus interference from another communication system can be avoided. That is, ultrashort range noncontact communication through electrical field coupling using an inductive electrical field or an electrostatic field is suitable for realizing weak radio waves.

The ultrashort range communication system in a noncontact manner has some advantages compared to an ordinary radio communication system. For example, when a radio signal is transmitted/received between apparatuses that are relatively separated from each other, the quality of the signal in a radio zone degrades in accordance with the existence of a surrounding reflective object or extension of a communication distance. However, in the short range communication, there is no dependency on a surrounding environment and a high-quality signal of low error rate can be transmitted at a high transmission rate. Furthermore, in the ultrashort range communication system, an improper apparatus that intercepts transmitted data does not intervene and thus there is no need to consider prevention of hacking on a transmission path and securement of confidentiality.

In the radio wave communication, an antenna needs to have a length of about a half or a quarter of a used wavelength λ, and thus the size of apparatus becomes large inevitably. Such constraints do not exist in the ultrashort range communication system using an inductive electrical field or an electrostatic field.

For example, Patent Document 1 (Japanese Unexamined Patent Application Publication No. 2006-60283) suggests an RFID tag system. This RFID tag system is capable of stably reading and writing information even if RFID tags attached to a plurality of items are overlapped each other, by forming a set of communication auxiliaries between which the RFID tags are placed.

Patent Document 2 (Japanese Unexamined Patent Application Publication No. 2004-214879) suggests a data communication apparatus using an inductive magnetic field. This data communication apparatus includes a main body, an attaching unit used to attach the main body to a user's body, an antenna coil, and a data communication unit to perform data communication with an external communication apparatus in a noncontact manner via the antenna coil. The antenna coil and the data communication unit are placed in an outer case provided at an upper part of the main body.

Patent Document 3 (Japanese Unexamined Patent Application Publication No. 2005-18671) suggests a mobile phone apparatus with an RFID ensuring a communication distance without losing portability, as a configuration in which an antenna coil to perform data communication with an external apparatus is mounted on a memory card inserted into a mobile information apparatus and an RFID antenna coil is placed outside a memory card slot of the mobile information apparatus.

The RFID system according to the related art using an electrostatic field or an inductive electrical field uses low-frequency signals and thus communication speed thereof is low, which is not suitable for large-volume data transmission. In the communication method using an inductive magnetic field generated by an antenna coil, problems about mounting arise. For example, it may be impossible to perform communication when a metal plate exists on the back of the coil, and a large area is required on the plane for placing the coil. Furthermore, loss in a transmission path is high and signal transmission efficiency is poor.

Under these circumstances, the inventors of the present invention believe that high-speed data transmission ensuring confidentiality can be realized by a weak electrical field that do not require a license of a radio station by using an ultrashort range communication system to transmit RF signals through electrical field coupling, that is, to transmit UWB communication signals by using electrical field coupling in an electrostatic field or an inductive electrical field or using magnetic field coupling in an inductive magnetic field. Also, the inventors of the present invention believe that large-volume data, such as moving pictures or music data of a CD, can be transferred at high speed and in short time in the UWB communication system using an electrostatic field or an inductive electrical field.

SUMMARY OF THE INVENTION

In the radio communication system based on a radio wave communication method using a radiated electrical field, radio signals can be transmitted to a remote site. However, generation of radio waves undesired in a radio communication system of RF interferes another radio communication system and causes malfunction of peripheral information apparatuses. Also, disturbing radio waves from the outside may disturb communication. Unnecessary radio waves can be blocked by placing a radio wave absorber near an antenna of a radio apparatus. In that case, however, the absorber also absorbs desired radio waves to transmit desired signals, which disables communication.

On the other hand, in a noncontact communication system using electrical field coupling in an electrostatic field or an inductive electrical field, in which a communication range is limited to a short range, or in a noncontact communication system using magnetic field coupling in an inductive magnetic field, generation of unnecessary radio waves can be suppressed and reception of external radio waves can be prevented by ideally designing an electrode or a coil used for coupling. As described above, high-speed data transmission ensuring confidentiality can be realized by an ultrashort range communication system to transmit UWB communication signals through an electrostatic field by using a weak electrical field not requiring a license of a radio station.

However, it is actually difficult to design an RF circuit to completely suppress a radiated electrical field. Even a communication apparatus that is originally designed in an electrical field coupling type emits or receives unnecessary radio waves due to trivial mismatch in the circuit or a current flowing in the ground disadvantageously. For example, assuming that power input to a coupler is 100%, 10% of the power may be emitted as radio waves. As described above, radio waves from a radiated electrical field propagate to a remote site compared to those from an electrostatic field or an inductive electrical field. Thus, an effect on/from an external electronic apparatus is great.

The present invention has been made in view of the above-described technical problems, and is mainly directed to providing an excellent communication system and communication apparatus enabling information apparatuses placed in a short range to preferably transmit RF signals by using an electrostatic field, an inductive electrical field, or an inductive magnetic field.

Also, the present invention is directed to providing an excellent communication system and communication apparatus enabling couplers mounted on respective information apparatuses to efficiently transmit RF signals so as to realize large-volume transmission in a short range by using electrical field coupling or magnetic field coupling.

Also, the present invention is directed to providing an excellent communication system and communication apparatus that do not inhibit generation of an electrostatic field or an inductive electrical field and that is capable of suppressing generation of a radiated electrical field, which causes disturbing waves to the outside, while allowing information apparatuses placed in a short range to preferably transmit RF signals by using electrical field coupling or magnetic field coupling.

According to an embodiment of the present invention, there is provided a communication system including a transmitter including a transmitting circuit to generate radio frequency signals for transmitting data and an electrical field coupling antenna to transmit the radio frequency signals as an electrostatic field or an inductive electrical field; and a receiver including an electrical field coupling antenna and a receiving circuit to perform a reception process on radio frequency signals received by the electrical field coupling antenna. Each of the electrical field coupling antennas of the transmitter and the receiver includes a coupling electrode, a resonant portion to strengthen electrical coupling between the coupling electrodes, and a radio wave absorber placed near the coupling electrode. The radio frequency signals are transmitted through electrical field coupling between the electrical field coupling antennas facing each other of the transmitter and the receiver.

Note that the "system" is a logical set of a plurality of apparatuses (or functional modules realizing a specific function). Whether the respective apparatuses or functional modules should be placed in a single casing is not specified (this is the same in the following description).

Many radio communication systems represented by a radio LAN use radiated electrical field that is generated when a current is flown to an antenna, and thus radio waves are disadvantageously emitted regardless of the presence/absence of the other end of communication. Since the radiated electrical field gradually attenuates in inverse proportion to the distance from an antenna, signals reach a relatively remote site and become a source of disturbing radio waves to a neighboring communication system. Also, reception sensitivity of an antenna on the receiver side decreases due to an effect of disturbing radio waves. That is, in the radio wave communication method, it is difficult to realize radio communication with a communication apparatus in an ultrashort range.

On the other hand, the communication system according to the embodiment of the present invention includes the transmitter to generate RF signals, such as UWB signals, for transmitting data and the receiver to perform a reception process on the RF signals. The communication system is constituted so that the EFC antennas of the transmitter and receiver couple with each other in an electrostatic field or an inductive electrical field to transmit RF signals in a noncontact manner when the EFC antennas face each other in an ultrashort range.

In this type of communication system using an electrostatic field or an inductive electrical field, coupling does not occur when there is no other end of communication. The intensities of the inductive electrical field and electrostatic field steeply attenuate in inverse proportion to the square and the third power of a distance, respectively. That is, an unnecessary electrical field is not generated and an electrical field does not reach a remote site, and thus another communication system is not disturbed. Furthermore, even if radio waves come from a remote site, the coupling electrode does not receive the radio waves, so that interference by another communication system can be avoided. Accordingly, weak radio waves not requiring a license of a radio station can be generated, and prevention of hacking and securement of confidentiality on a transmission path need not be considered. Furthermore, this communication system performs wideband communication using RF signals, such as UWB signals, and thus can perform large-volume communication in an ultrashort range. For example, large volume data, such as moving pictures or music data of a CD, can be transferred at high speed and in short time.

In an RF circuit, propagation loss occurs in accordance with a propagation distance with respect to a wavelength. Thus, propagation loss should be sufficiently suppressed in order to transmit RF signals, such as UWB signals.

In the communication system according to the embodiment of the present invention, each of the EFC antennas of the transmitter and the receiver includes a resonant portion and an impedance matching portion. The resonant portions enable intense electrical field coupling. The impedance matching portion is constituted to realize impedance matching and suppress reflected waves between the electrodes of the transmitter and the receiver, that is, at a coupling portion. In other words, the pair of EFC antennas of the transmitter and the receiver function as a bandpass filter to pass a desired RF band.

The impedance matching portion and the resonant portion can be constituted by a lumped-constant circuit in which series and parallel inductors connect to an RF signal transmission path. In the lumped-constant circuit, however, constants of inductance L and capacitance C are determined based on a center frequency. Thus, in a band deviating from an assumed center frequency, impedance matching is not realized and a designed operation is not performed. In other words, an effective operation can be performed only in a narrow band. Particularly, in a high frequency band, a resonant frequency depends on a fine configuration of a lumped-constant circuit and variations of an inductor and a capacitor having a small value, and thus it is difficult to adjust frequencies. Also, when the impedance matching portion and the resonant portion are constituted by a lumped-constant circuit and when a compact chip inductor is used as an inductor, loss occurs inside the chip inductor and propagation loss between the EFC antennas increases disadvantageously.

When the EFC antenna is accommodated in a casing of an apparatus, it is assumed that a center frequency deviates due to an effect of a peripheral metal component. For this reason, the EFC antenna should be designed so that it effectively operates in a wide frequency band. If a plurality of devices of a narrow band are placed in a system, the band of the entire system becomes narrower, and thus it is difficult to use a plurality of EFC antennas in a wideband communication system.

In the communication system according to the embodiment of the present invention, the coupling electrode, the impedance matching portion to realize impedance matching between the coupling electrodes, and the resonant portion are constituted by using a distributed-constant circuit instead of a lumped-constant circuit in the EFC antenna, thereby realizing a wideband.

The EFC antenna is mounted on a printed circuit board as one of mounted components, like a circuit module constituting a communication circuit to process RF signals for transmitting data. In such a case, the distributed-constant circuit can be constituted as a stub including a microstrip line or a coplanar waveguide placed on the printed circuit board. A ground is provided on the other surface of the printed circuit board, and an end of the stub may be connected to the ground via a through hole extending in the printed circuit board. The stub has a length of about λ/2 of a usable frequency. The EFC antenna may be placed at almost the center of the stub, which is the position of maximum amplitude of a standing wave.

The coupling electrode can be constituted as a conductive pattern deposited on a surface of an insulative spacer. This spacer is a circuit component mounted on the printed circuit board. When the spacer is mounted on the printed circuit board, the conductive pattern of the coupling electrode is connected to almost the center of the stub via a through hole in the spacer. By using an insulative material of high permittivity as a spacer, the length of the stub can be made shorter than λ/2 due to a wavelength shortening effect.

However, it is difficult to completely suppress radiated electrical field in an actual design of an RF circuit. Even a communication apparatus that is originally designed for electrical field coupling emits or receives unnecessary radio waves due to trivial mismatch in the circuit or a current flowing in the ground.

For this reason, in the communication system according to the embodiment of the present invention, a magnetic loss material is placed near the coupling electrode when the EFC antennas of the transmitter and the receiver couple with each other in an electrostatic field or an inductive electrical field.

It is effective to use a radio wave absorber to suppress a radiated electrical field that propagates to a remote site and that has a great effect between electronic apparatuses. When a radio wave absorber is regarded as a distributed-constant circuit in RF, distributed series resistance R (Ω/m) and distributed parallel conductance G (S/m) play a role of absorbing energy. Here, the distributed series resistance R corresponds to μ" representing an imaginary part of complex permeability, and the distributed parallel conductance G corresponds to the sum of σ representing an imaginary part of complex permittivity and a calculation result obtained by dividing conductivity a by angular frequency ω, that is, ∈"+σ/ω. The radio wave absorber can be classified into a magnetic loss material based on complex permeability μ", a dielectric loss material based on complex permittivity ∈", and a conductive loss material based on conductivity σ, in accordance with a material constant carrying loss. The magnetic loss μ" occurs when a spin carrying magnetism in a magnetic material delays with respect to change of an RF magnetic field. The dielectric loss ∈" occurs when a dipole having a dielectric performance delays with respect to change of an RF electrical field. The conductive loss σ occurs when a current having the same phase as that of an electrical field flows and when energy of electromagnetic waves is transformed to heat.

The radio waves are "waves of an electrical field" and "waves of a magnetic field" sequentially propagating in the air and are regarded as a kind of electromagnetic waves. Typically, when a current is flown to a conductor such as an antenna, a magnetic field is generated around the conductor, whereby an electrical field is generated, and a magnetic field is further generated due to the electrical field. In this way, magnetic and electrical fields are alternately generated, so that radio waves reach a relatively remote site (see FIG. 27). The waves of electrical and magnetic fields interact with each other like a chain and travel in the traveling direction of waves while maintaining an orthogonal relationship (see FIG. 28).

As described above, radio waves include waves of electrical and magnetic fields. Thus, by suppressing waves of one of electrical and magnetic fields, waves of the other field are significantly attenuated, so that propagation thereof can be suppressed. That is, radio waves can be suppressed by any of a magnetic loss material to mainly absorb and attenuate a magnetic field and a dielectric loss material to mainly absorb and attenuate an electrical field.

In the communication system to perform noncontact communication through electrical field coupling between electrodes according to the embodiment of the present invention, when a magnetic loss material is provided around the coupling electrode, radio waves are absorbed by the magnetic loss material, but an electrostatic field and an inductive electrical field are unlikely to be affected. Therefore, the magnetic loss material placed near the coupling electrode can suppress radiation of unnecessary radio waves and an effect of disturbing radio waves coming from the outside. Also, stable data communication can be performed by electrical field coupling between the transmitter and the receiver in a short range.

According to another embodiment of the present invention, there is provided a communication system including a transmitter including a transmitting circuit to generate radio frequency signals for transmitting data and an electrical field coupling antenna to transmit the radio frequency signals as an inductive magnetic field; and a receiver including an electrical field coupling antenna and a receiving circuit to perform a reception process on radio frequency signals received by the electrical field coupling antenna. Each of the electrical field coupling antennas of the transmitter and the receiver includes a coupling coil and a radio wave absorber placed near the coupling coil. The radio frequency signals are transmitted through inductive magnetic field coupling between the electrical field coupling antennas facing each other of the transmitter and the receiver.

In the communication system using magnetic field coupling that includes the transmitter and receiver including coils coupled in an inductive magnetic field and that performs noncontact communication through magnetic coupling in a short range, each of the coupling coils is placed inside a dielectric loss material or on a surface of the dielectric loss material. In this case, as in the noncontact communication system using electrical field coupling, radio waves are absorbed by a dielectric loss material when the dielectric loss material is around the coil. However, an inductive magnetic field is unlikely to be affected. Therefore, radio waves are absorbed by the dielectric loss material placed near the coupling coil, but radiation of unnecessary radio waves and an effect of disturbing radio waves coming from the outside can be suppressed, and stable data communication can be performed through magnetic field coupling between the transmitter and receiver in a short range.

According to an embodiment of the present invention, an excellent communication system and communication apparatus that cause electrical field coupling between EFC antennas of a transmitter and a receiver in an RF band, that effectively operate in a wideband, and that enable large-volume data transmission through a noise-resistant electrical field coupling transmission path or magnetic field coupling transmission path can be provided. An impedance matching portion and a resonant portion of the EFC antenna can be constituted as a pattern on a printed circuit board, that is, a stub as a distributed-constant circuit, so that a favorable operation over a wideband can be realized.

Also, an excellent communication system and communication apparatus that allow EFC antennas mounted on information apparatuses to efficiently transmit RF signals and that enable large-volume data transmission using electrical field coupling or magnetic field coupling in a short range can be provided.

Accordingly, by suppressing propagation of unnecessary radio waves, an inverse effect of electromagnetic waves emitted from a transmitter on another electronic apparatus can be prevented, so that a malfunction caused by disturbing radio waves coming from the outside can be prevented.

Further features and advantages of the present invention will become apparent from the following description based on an embodiment and the attached drawings.

DESCRIPTION OF THE PREFERRED EMBODIMENTS

Figure 1:
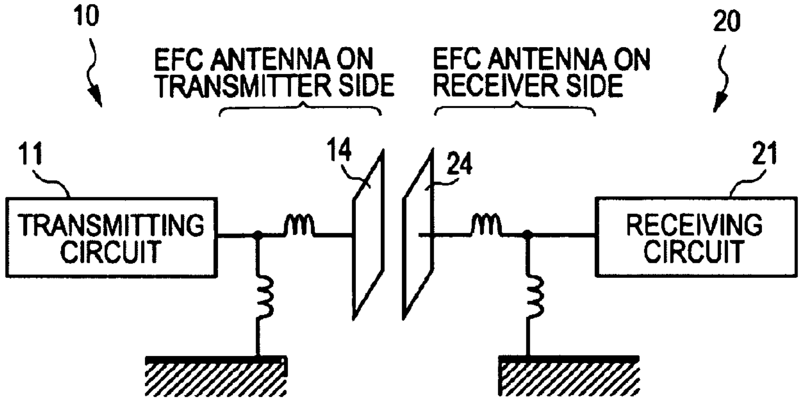
FIG. 1 illustrates an example of a configuration of a non-contact communication system using electrical field coupling in an electrostatic field or an inductive electrical field.

Hereinafter, an embodiment of the present invention is described with reference to the drawings.

The present invention relates to a communication system to perform data transmission between information apparatuses by using electrical field coupling in an electrostatic field or an inductive electrical field. According to a communication method based on an electrostatic field or an inductive electrical field, no coupling relationship arises and no radio waves are emitted when no other end of communication exists in the neighborhood. Accordingly, any communication system is not disturbed. Furthermore, even if radio waves come from a remote site, a coupler does not receive the radio waves and thus interference by another communication system can be avoided.

In radio wave communication using an antenna according to a related art, the intensity of a radiated electrical field is inversely proportional to a distance from the antenna. On the other hand, the intensity of an inductive electrical field decreases in inverse proportion to the square of the distance, and the intensity of an electrostatic field decreases in inverse proportion to the third power of the distance. Thus, according to the communication method based on electrical field coupling, weak radio waves of a noise level for a neighboring radio system can be generated, so that a license of a radio station is not required.

A temporally-fluctuating electrostatic field may be called "quasi-electrostatic field". In this specification, however, the "quasi-electrostatic field" is called "electrostatic field".

A communication system according to a related art using an electrostatic field or an inductive electrical field uses low-frequency signals and is not suitable for large-volume data transmission. On the other hand, in the communication system according to an embodiment of the present invention, large-volume data transmission can be performed by transmitting radio frequency (RF) signals through electrical field coupling. Specifically, by applying a communication method using an RF and a wideband as in ultrawideband (UWB) communication to electrical field coupling, large-volume data communication can be realized by using weak radio waves.

The UWB communication uses a very wide frequency band of 3.1 GHz to 10.6 GHz and can realize radio transmission of large-volume data at about 100 Mbps in a short range. Also, the UWB communication enables data transmission at a rate over 100 Mbps without occupying a transmission band of 3.1 GHz to 10.6 GHz, and an RF circuit can be easily fabricated. In view of this, a transmission system using an UWB low-band of 3.1 to 4.9 GHz has been actively developed.

The inventors of the present invention regard a data transmission system using the UWB low-band as one of effective radio communication techniques to be provided on a mobile apparatus. For example, high-speed data transmission in a short range can be realized, such as an ultrahigh-speed DAN (device area network) for a short range including a storage device. According to a UWB communication system using electrical field coupling in an electrostatic field or an inductive electric field, data communication through a weak electrical field can be performed. Also, large-volume data, such as moving pictures or music data of a CD, can be transferred at high speed and in short time.

FIG. 1 illustrates an example of a configuration of a non-contact communication system using electrical field coupling in an electrostatic field or an inductive electrical field. The communication system illustrated in FIG. 1 includes a transmitter 10 to transmit data and a receiver 20 to receive data. As illustrated in FIG. 1, when electrical field coupling (EFC) antennas on the transmitter and receiver sides face each other, two electrodes operate as a capacitor and the entire configuration operates as a bandpass filter. Accordingly, RF signals can be efficiently transmitted between the two EFC antennas. In order to favorably form a transmission path based on electrical field coupling in the communication system illustrated in FIG. 1, sufficient impedance matching between the EFC antennas of the transmitter and receiver and effective operation in an RF wideband are desired.

A transmitting electrode 14 and a receiving electrode 24 included in the transmitter 10 and the receiver 20, respectively, face each other with a gap of about 3 cm therebetween and can couple with each other through an electrical field. A transmitting circuit 11 on the transmitter side generates an RF transmission signal, such as an UWB signal, based on transmission data in response to a transmission request from an upper application, and then the signal is transmitted from the transmitting electrode 14 to the receiving electrode 24. Then, the receiving circuit 21 on the receiver 20 side demodulates and decodes the received RF signal and transfer reproduced data to an upper application.

According to a communication method using an RF wideband, as in the UWB communication, ultrahigh-speed data transmission of about 100 Mbps can be realized in a short range. When the UWB communication is performed through electrical field coupling instead of radio waves, since the intensity of the electrical field is inversely proportional to the third power of the square of a distance, weak radio waves not requiring a license of a radio station can be generated by suppressing the intensity of the electrical field (the intensity of radio waves) to a predetermined level or lower at three meters from radio facilities, so that the communication system can be configured at low cost. Also, when data communication is performed through electrical field coupling in an ultrashort range, the following advantages can be obtained, that is, degradation of signal quality due to a reflective object in the surroundings can be prevented, and there is no need to consider prevention of hacking or securement of confidentiality on a transmission path.

On the other hand, propagation loss increases in accordance with a propagation distance with respect to a wavelength, and thus propagation loss should be sufficiently suppressed when RF signals are propagated through electrical field coupling. In the communication method for transmitting RF wideband signals, such as UWB signals, through electrical field coupling, even about 3 cm for ultrashort range communication corresponds to about a half of wavelength in a usable frequency band of 4 GHz, and thus 3 cm is a noneligible length. Particularly, in an RF circuit, a problem of characteristic impedance is more serious than in a low-frequency circuit, and an effect of impedance mismatch becomes apparent at a junction between electrodes of a transmitter and a receiver.

Figure 2:
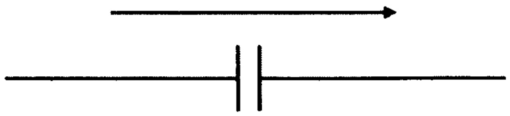
FIG. 2 illustrates an example of a configuration in which each of a transmitter and a receiver includes an electrical field coupling (EFC) antenna including only an electrode and a coupling portion operates simply as a parallel plate capacitor in communication using frequencies of a KHz or MHz band.
Figure 3:
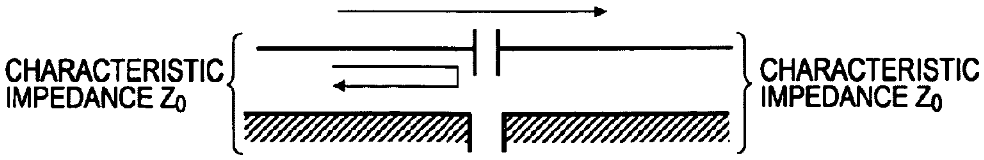
FIG. 3 illustrates a state where propagation loss occurs due to reflected signals at an impedance mismatch portion in a coupling portion in communication using radio frequencies of a GHz band.

Propagation loss in the air is small in communication using frequencies in a KHz or MHz band. Thus, even if a transmitter and a receiver include an EFC antenna including only an electrode, as illustrated in FIG. 2, and if a coupling portion operates simply as a parallel plate capacitor, desired data transmission can be performed. However, propagation loss in the air is large in communication using radio frequencies in a GHz band. Thus, reflection of signals should be suppressed to enhance transmission efficiency. As illustrated in FIG. 3, assume that an RF signal transmission path is adjusted to predetermined characteristic impedance $Z_0$ in each of the transmitter and receiver. In this case, impedance matching is not realized at a coupling portion only through coupling by the parallel plate capacitor. Therefore, propagation loss occurs due to reflection of signals at the part of impedance mismatch at the coupling portion, so that efficiency decreases. For example, even if the RF signal transmission path between the transmitting circuit 11 and the transmitting electrode 14 is a coaxial line having impedance matching of 50Ω, signals reflect and propagation loss occurs if impedance mismatch occurs at the coupling portion between the transmitting electrode 14 and the receiving electrode 24.

Figure 4:
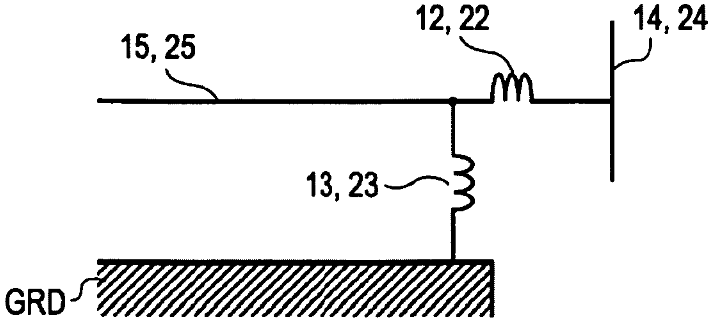
FIG. 4 illustrates an equivalent circuit of the EFC antenna in which an impedance matching portion and a resonant portion are constituted by a lumped-constant circuit.
Figure 5:
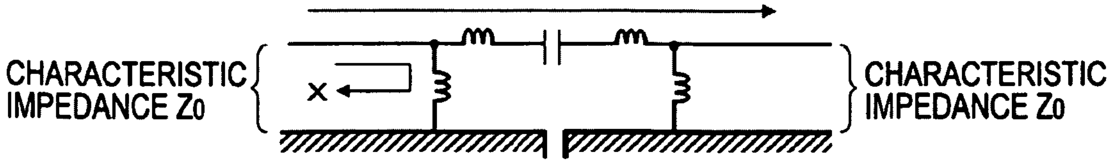
FIG. 5 illustrates a state where electrodes of the EFC antennas illustrated in FIG. 4 face each other.

FIG. 4 illustrates the EFC antenna placed in each of the transmitter 10 and the receiver 20. The EFC antenna includes the flat electrode 14 or 24, a series inductor 12 or 22, and a parallel inductor 13 or 23, which connect to an RF signal transmission path 15 or 25. When the EFC antennas are placed by facing each other as illustrated in FIG. 5, the two electrodes operate as a capacitor and the entire configuration operates as a bandpass filter. Accordingly, RF signals can be efficiently transmitted between the two EFC antennas. Note that the RF signal transmission path is a coaxial cable, a microstrip line, or a coplanar line.

Figure 6A:
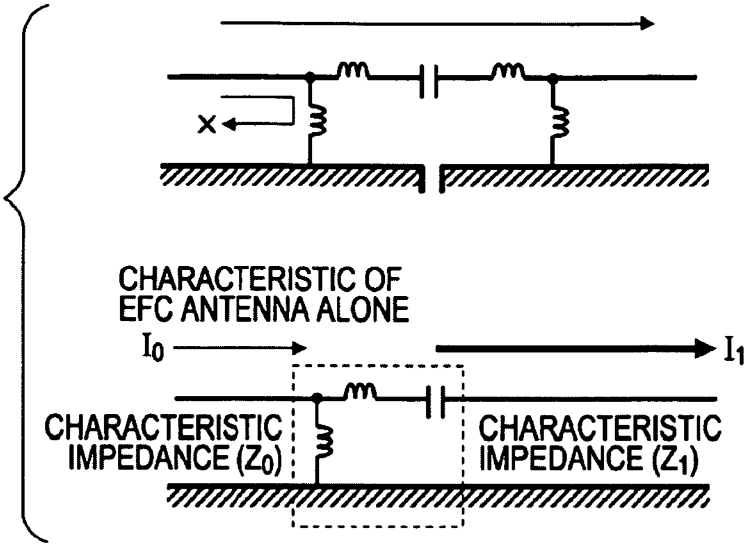
FIG. 6A illustrates a characteristic of the EFC antenna illustrated in FIG. 4 alone.

Here, if an aim is only to realize impedance matching and suppress reflected waves between the electrodes of the transmitter 10 and the receiver 20, that is, at the coupling portion, the configuration illustrated in FIG. 6A (the flat electrodes 14 and 24, the series inductors 12 and 22, and the parallel inductors 13 and 23 connect to the RF signal transmission paths 15 and 25 in the respective EFC antennas) is unnecessary. In that case, a simpler configuration illustrated in FIG. 6B (the flat electrodes 14 and 24 and the series inductors 12 and 22 connect to the RF signal transmission paths 15 and 25 in the respective EFC antennas) may be adopted. That is, in the case where the EFC antennas on the transmitter and receiver sides face each other in an ultrashort range, the EFC antennas can be designed to realize continuous impedance at the coupling portion only by providing series inductors on RF signal transmission paths.

Figure 6B:
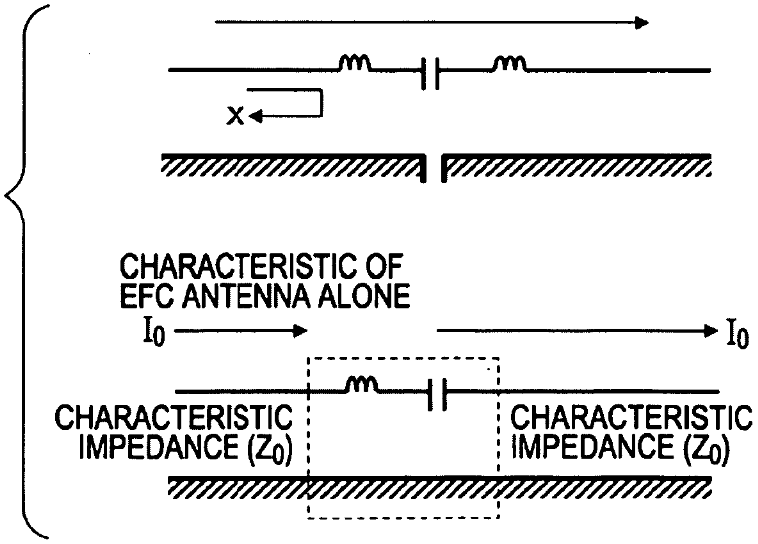
FIG. 6B illustrates a characteristic of the EFC antenna illustrated in FIG. 4 alone.

In the configuration example illustrated in FIG. 6B, the characteristic impedance is the same before and after the coupling portion, and thus magnitude of current does not change. On the other hand, when the RE signal transmission path is grounded via the parallel inductor before the electrode, as illustrated in FIG. 6A, the EFC antenna alone functions as an impedance converting circuit to convert characteristic impedance $Z_0$ before the EFC antenna to characteristic impedance $Z_1$ after the EFC antenna ($Z_0>Z_1$). Accordingly, an input current $I_0$ to the EFC antenna can be amplified to an output current $I_1$ ($I_0<I_1$).

Figure 7A:
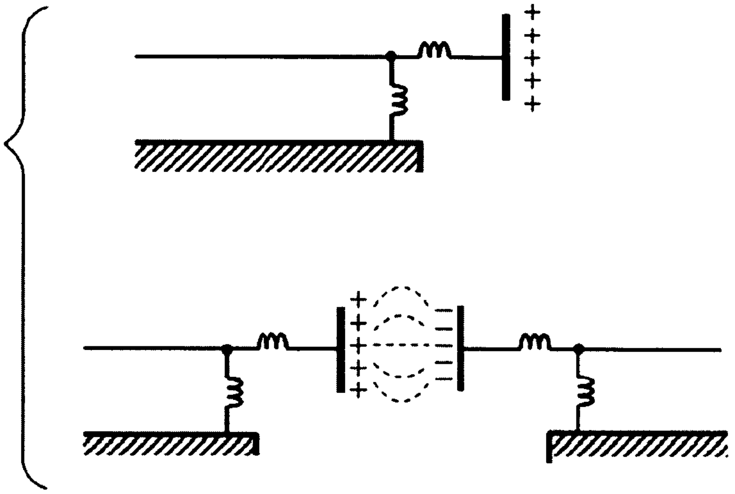
FIG. 7A illustrates a state where the EFC antenna induces an electrical field by a function as an impedance converter.
Figure 7B:
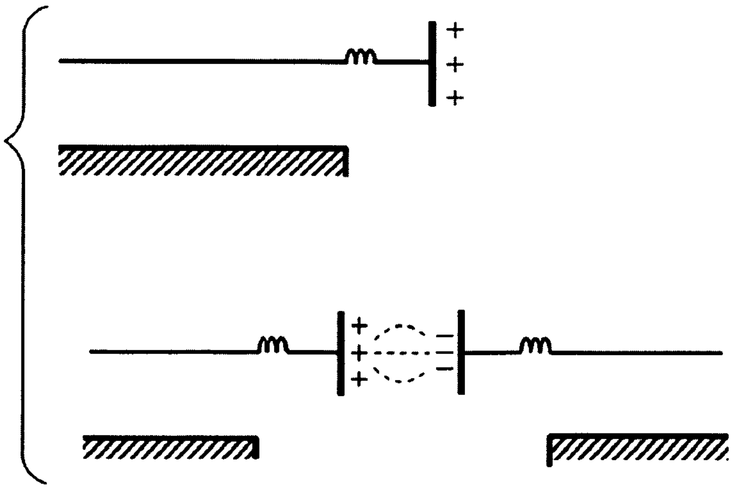
FIG. 7B illustrates a state where the EFC antenna induces an electrical field by a function as an impedance converter.

FIGS. 7A and 7B illustrate a state where an electrical field is induced by electrical field coupling between the electrodes in the EFC antennas provided with parallel inductors and not provided with parallel inductors. As can be understood from the figures, a more intense electrical field can be induced by providing parallel inductors in addition to series inductors in the EFC antennas so as to realize strong coupling between the electrodes. When an intense electrical field is induced near an electrical field, as illustrated in FIG. 7A, the generated electrical field propagates in a front direction of the surface of the electrode as longitudinal waves vibrating in a traveling direction. The waves of the electrical field enable propagation of signals between the electrodes even if the distance between the electrodes is relatively long.

Therefore, in the communication system to transmit RF signals, such as UWB signals, through electrical field coupling, essential conditions for the EEC antennas are as follows:

(1) Include electrodes for electrical field coupling;

(2) Include parallel inductors for coupling in a more intense electrical field; and (3) Constants of the inductors and a capacitor constituted by the electrodes are set so that impedance matching can be realized when the EFC antennas face each other in a frequency band used in communication.

Figure 8:
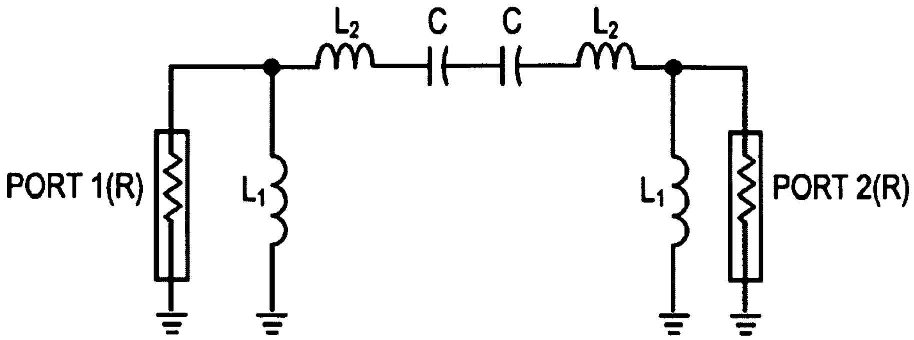
FIG. 8 illustrates an equivalent circuit of a bandpass filter constituted by placing two EFC antennas, each illustrated in FIG. 4, such that the EFC antennas face each other.

In the bandpass filter including the pair of EFC antennas having electrodes facing each other, as illustrated in FIG. 5, the passing frequency $f_0$ thereof can be determined based on the inductance of the series inductors and the parallel inductors and the capacitance of the capacitor constituted by the electrodes. FIG. 8 illustrates an equivalent circuit of the bandpass filter including the pair of EFC antennas. Characteristic impedance is R [Ω], a center frequency is $f_0$ [Hz], a phase difference between an input signal and a passing signal is α [radian] ($\pi<\alpha<2\pi$), and the capacitance of the capacitor constituted by the electrodes is C/2. Under these conditions, constants $L_1$ and $L_2$ of the parallel and series inductors included in the bandpass filter can be calculated by using the following expressions in accordance with the usable frequency $f_0$.

[1]

$$L_1 = -\frac{R(1+\cos\alpha)}{2\pi f_0 \sin\alpha}[H]$$

$$L_2 = \frac{1+\pi f_0 CR\sin\alpha}{4\pi^2 f_0^2 C}[H]$$

Figure 9:
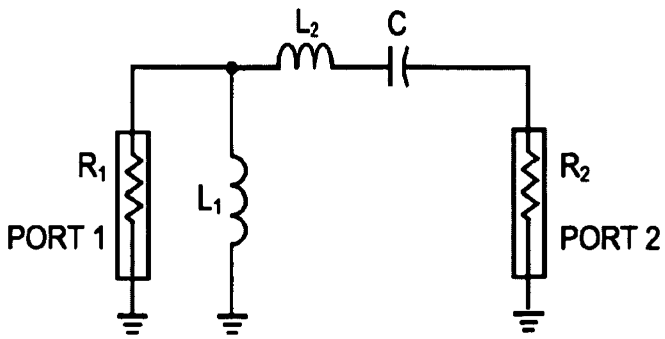
FIG. 9 illustrates an equivalent circuit of an impedance converting circuit as an EFC antenna alone.

On the other hand, FIG. 9 illustrates an equivalent circuit of the EFC antenna alone functioning as an impedance converting circuit. In the circuit diagram in FIG. 9, by setting parallel inductance $L_1$ and series inductance $L_2$ in accordance with a usable frequency $f_0$ so as to satisfy the following expressions, an impedance converting circuit to convert characteristic impedance $R_1$ to $R_2$ can be constituted.

[2]

$$L_1 = \frac{R_1}{2\pi f_0}\sqrt{\frac{R_2}{R_1-R_2}}\,[H]$$

$$L_2 = \frac{1}{4\pi^2 f_0^2}\left(\frac{1}{C} - 2\pi f_0\sqrt{R_2(R_1-R_2)}\right)[H]$$

$$R_1 > R_2$$

As described above, in the noncontact communication system illustrated in FIG. 1, ultrashort range data transmission having an unprecedented characteristic can be realized when communication apparatuses to perform UWB communication use the EFC antenna illustrated in FIG. 4 instead of an antenna used in a radio communication apparatus of a radio wave communication method according to a related art.

As illustrated in FIG. 5, the two EFC antennas, of which electrodes face each other with an ultrashort distance therebetween, operate as a bandpass filter to pass signals in a desired frequency band. The EFC antenna alone operates as an impedance converting circuit to amplify a current. On the other hand, when the EFC antenna is placed alone in a free space, input impedance of the EFC antenna does not match the characteristic impedance of the RF signal transmission path. Therefore, signals input from the RF signal transmission path is reflected in the EFC antenna and is not emitted to the outside.

Thus, in the noncontact communication system illustrated in FIG. 1, the transmitter side does not emit radio waves when there is no other end of communication, unlike the antenna. Only when the other end of communication approaches and when electrodes on both sides constitute a capacitor, impedance matching is realized as illustrated in FIG. 5 and then RF signals are transmitted.

Figure 10:
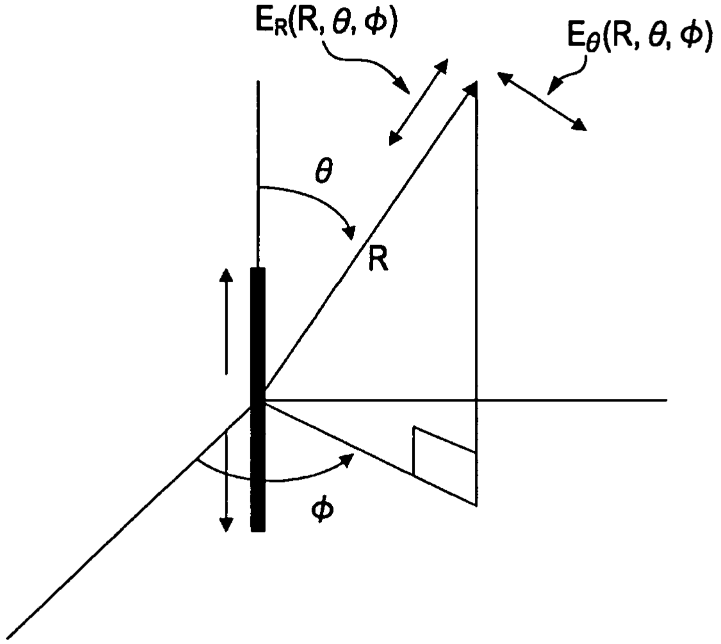
FIG. 10 (PRIOR ART)
FIG. 10 illustrates an electromagnetic field by small dipole.

Now, an electromagnetic field that is generated in a coupling electrode on the transmitter side is discussed. FIG. 10 illustrates an electromagnetic field generated by a small dipole. As illustrated in FIG. 10, the electromagnetic field mainly contains an electrical field component $E_\theta$ that vibrates in the direction vertical to the propagation direction (transverse wave component) and an electrical field component $E_R$ that vibrates in the direction parallel to the propagation direction (longitudinal wave component). Also, a magnetic field $H_\Phi$ is generated around the small dipole. The following expressions express the electromagnetic field generated by the small dipole. However, an arbitrary current distribution is regarded as a sequential set of such small dipoles, and thus the electromagnetic field induced thereby has the same property (e.g., see "Antenna, Denpa-Denpan" pp. 16-18, written by Yasuto Mushiake, published by CORONA publishing Co., Ltd.)

[3]

$$E_\theta = \frac{pe^{-jkR}}{4\pi\varepsilon}\left(\frac{1}{R^3} + \frac{jk}{R^2} - \frac{k^2}{R}\right)\sin\theta$$

$$E_R = \frac{pe^{-jkR}}{2\pi\varepsilon}\left(\frac{1}{R^3} + \frac{jk}{R^2}\right)\cos\theta$$

$$H_\phi = \frac{j\omega pe^{-jkR}}{4\pi}\left(\frac{1}{R^2} + \frac{jk}{R}\right)\sin\theta$$

As can be understood from the above expressions, the transverse wave component of the electrical field contains a component inversely proportional to a distance (radiated electrical field), a component inversely proportional to the square of a distance (inductive electrical field), and a component inversely proportional to the third power of a distance (electrostatic field). On the other hand, the longitudinal wave component of the electrical field contains only a component inversely proportional to the square of a distance (inductive electrical field) and a component inversely proportional to the third power of a distance (electrostatic field) and does not contain a component of a radiated electromagnetic field. Also, the electrical field component $E_R$ becomes maximum in the direction where $|\cos\theta|=1$, that is, in the direction indicated by an arrow in FIG. 10.

In radio wave communication widely used in radio communication, radio waves radiated from an antenna are transverse waves $E_\theta$ that vibrate in the direction orthogonal to the traveling direction of the radio waves. When the orientations of polarized waves are orthogonal to each other, it is impossible to perform communication. On the other hand, electromagnetic waves radiated from coupled electrodes in a communication method using an electrostatic field or an inductive electrical field contain longitudinal waves $E_R$ that vibrate in the traveling direction, in addition to the transverse waves $E_\theta$. The transverse waves $E_R$ are also called "surface waves". Incidentally, surface waves can propagate through the inside of a conductive, dielectric, or magnetic medium.

Among transmitted waves using an electromagnetic field, the waves having a phase velocity v lower than light speed c are called "slow waves" and the waves having a phase velocity v higher than light speed c are called "fast waves". The surface waves correspond to the slow waves.

In the noncontact communication system, signals can be transmitted by using any of a radiated electrical field, an electrostatic field, and an inductive electrical field as a medium. However, the radiated electrical field, which is inversely proportional to a distance, can be disturbing waves to another system at a relatively remote site. For this reason, it is preferred to perform noncontact communication by using the transverse waves $E_R$ that do not contain a component of a radiated electrical field while suppressing a component of a radiated electrical field, in other words, while suppressing the transverse waves $E_\theta$ containing a component of a radiated electrical field.

In view of the above-described points, the EFC antenna according to this embodiment has the following configuration. First, it can be understood from the above three expressions expressing an electromagnetic field that $E_\theta=0$ is satisfied and the $E_R$ component has a maximum value when $\theta=0°$. That is, $E_\theta$ becomes maximum in the direction vertical to the direction in which a current flows, whereas $E_R$ becomes maximum in the direction parallel to the direction in which a current flows. Thus, it is desired to increase a current component in the direction vertical to the electrode in order to maximize $E_R$ in the front direction vertical to the surface of the electrode. On the other hand, when a feeding point deviates from the center of the electrode, a current component in the direction parallel to the electrode increases due to the deviation. Also, in accordance with the current component, the $E_\theta$ component in the front direction of the electrode increases. For this reason, in the EFC antenna according to this embodiment, a feeding point is provided without deviation from the center of the electrode so that the $E_R$ component becomes maximum.

Off course, in a traditional antenna, an electrostatic field and an inductive electrical field are generated as well as a radiated electrical field, and electrical field coupling occurs when transmission and reception antennas are close to each other. In that case, however, most part of energy is emitted as a radiated electrical field. This is inefficient as noncontact communication and unnecessary radio waves may adversely affect peripheral electronic apparatuses. On the other hand, in the EFC antenna illustrated in FIG. 4, the coupling electrode and the resonant portion are configured so as to generate a more intense electrical field $E_R$ at a predetermined frequency and to enhance transmission efficiency. Also, as described below, by providing a radio wave absorber composed of a magnetic loss material near the coupling electrode, radiation of unnecessary radio waves and an effect of external disturbing radio waves are suppressed while stabilizing electrical field coupling between the transmitter and receiver in a short range.

When the EFC antenna illustrated in FIG. 4 is used alone on the transmitter side, the electrical field component $E_R$ of longitudinal waves is generated on the surface of the coupling electrode, but radio waves are hardly radiated because the transverse wave component $E_\theta$ including a radiated electrical field is smaller than $E_R$. In other words, disturbing waves to a neighboring system are not generated. Also, most of signals input to the EFC antenna is reflected by the electrode and returns to an input terminal.

On the other hand, when a pair of EFC antennas is used, that is, when EFC antennas on the transmitter and receiver sides are placed in a short range, the coupling electrodes thereof couple with each other mainly by a quasi-electrostatic field component and function as a capacitor and also as a bandpass filter, so that impedance matching can be realized. Thus, in a passband, most part of signals and power is transmitted to the other end of communication and a reflected part to the input terminal is small. Here, "short range" is defined by a wavelength $\lambda$ and corresponds to a state where $d \ll \lambda/2\pi$ is satisfied, in which "d" is the distance between the coupling electrodes. For example, when the usable frequency $f_0$ is 4 GHz and when the distance between the electrodes is 10 mm or less, that is called "short range".

When the EFC antennas of the transmitter and receiver are placed in a medium range, an electrostatic field attenuates and longitudinal waves of the electrical field component $E_R$ mainly containing an inductive electrical field are generated around the coupling electrode on the transmitter side. The longitudinal waves of the electrical field component $E_R$ are received by the coupling electrode on the receiver side, so that signal can be transmitted. However, compared to a case where the both EFC antennas are placed in a short range, the proportion of input signals reflected by the electrode and returning to the input terminal is high in the EFC antenna on the transmitter side. Here, "medium range" is defined by a wavelength λ and corresponds to a case where the distance "d" between the coupling electrodes is about one to a few times of λ/2π. For example, when the usable frequency $f_0$ is 4 GHz and when the distance between the electrodes is 10 to 40 mm, that is called "medium range".

As described above, in the EFC antenna illustrated in FIG. 4, the operating frequency $f_0$ at the impedance matching portion is determined based on the constants $L_1$ and $L_2$ of the parallel and the series inductors. A typical circuit manufacturing method is to constitute the series inductors 12 and 22 and the parallel inductors 13 and 23 by circuit elements regarded as a lumped-constant circuit. However, it is known that the band of the lumped-constant circuit is narrower than that of a distributed-constant circuit in an RF circuit. Also, the constant of an inductor is small when the frequency is high, and thus a resonant frequency varies due to variations of the constant disadvantageously.

Figure 11:
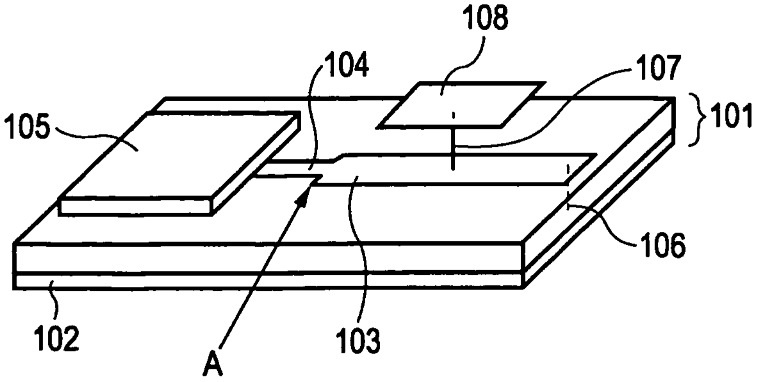
FIG. 11 illustrates an example of a configuration of an EFC antenna in which a distributed-constant circuit is used for an impedance matching portion and a resonant portion.

In view of the above-described problem, the EFC antenna according to this embodiment of the present invention is constituted by using a distributed-constant circuit, instead of a lumped-constant circuit, for the impedance matching portion and the resonant portion, so as to realize a wider band. FIG. 11 illustrates an example of a configuration of the EFC antenna in which a distributed-constant circuit is used for the impedance matching portion and the resonant portion.

In the example illustrated in FIG. 11, the EFC antenna is provided on a printed circuit board 101, including a ground conductor 102 on the lower side and a print pattern on the upper side. As the impedance matching portion and the resonant portion of the EFC antenna, a stub 103 is provided instead of the parallel and series inductors. The stub 103 is a microstrip line or a coplanar waveguide serving as a distributed-constant circuit and connects to a transmitting/receiving circuit module 105 via a signal line pattern 104. The stub 103 connects to and is short-circuited on the ground conductor 102 via a through hole 106 that extends through the printed circuit board 101 at its end. Also, the stub 103 connects to a coupling electrode 108 via a metal line 107 near the center of the stub 103.

Incidentally, "stub" in the field of electronics is a generic term of an electrical wire of which one end is connected and the other end is not connected or is grounded. The stub is provided in a circuit for adjustment, measurement, impedance matching, or filtering.

Figure 12:
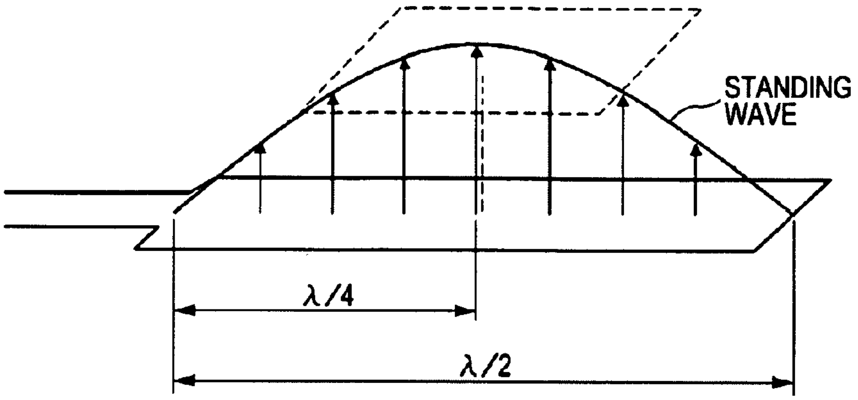
FIG. 12 illustrates a state where a standing wave is generated in a stub.

The length of the stub 103 is about λ/2 of an RF signal, and the signal line 104 and the stub 103 are constituted by a microstrip line or a coplanar line on the printed circuit board 101. When the length of the stub 103 is λ/2 and when the end thereof is short-circuited, a voltage magnitude of a standing wave generated in the stub 103 is 0 at the end of the stub 103 and is maximum at the center of the stub 103, that is, at λ/4 from the end of the stub 103 (see FIG. 12). By connecting the coupling electrode 108 to the center of the stub 103, where the voltage magnitude is the maximum, via the metal line 107, an EFC antenna of high propagation efficiency can be fabricated.

By using the stub 103, that is, the distributed-constant circuit including a microstrip line or a coplanar waveguide on the printed circuit board 101, as the impedance matching portion, an even characteristic can be obtained over a wideband. As a result, a modulating method to perform frequency diffusion on wideband signals, such as DSSS (direct sequence spread spectrum) and OFDM (orthogonal frequency division multiplexing), can be applied to the communication system illustrated in FIG. 1. The stub 103 is a microstrip line or a coplanar waveguide on the printed circuit board 101, and the DC resistance thereof is low. Accordingly, loss of RF signals is low and propagation loss between EFC antennas can be reduced.

The size of the stub 103 serving as the distributed-constant circuit is large (about λ/2 of RF signal). Thus, a dimensional error due to manufacturing tolerances is very small relative to the entire length, so that characteristic variations are less likely to occur.

Figure 13:
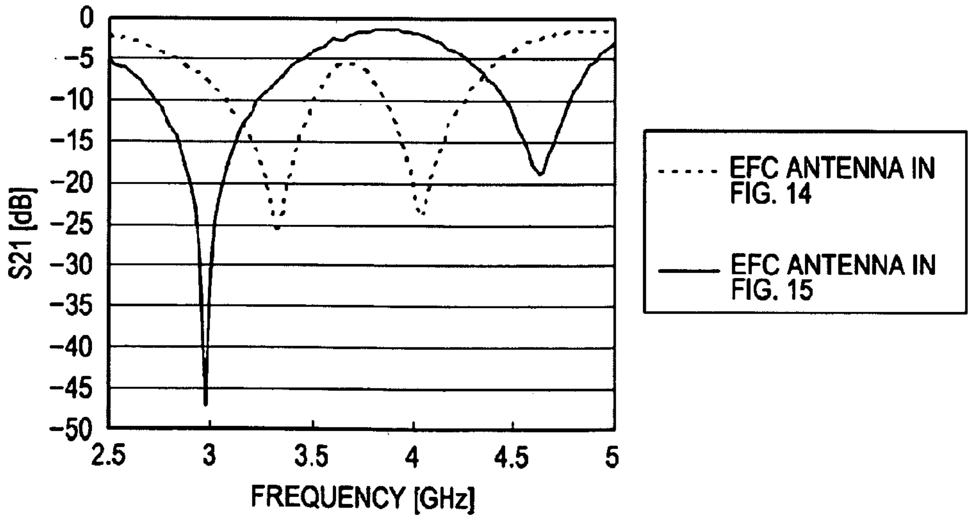
FIG. 13 illustrates comparison of frequency characteristics of EFC antennas in which an impedance matching portion is constituted by a lumped-constant circuit and a distributed-constant circuit, respectively.
Figure 14:
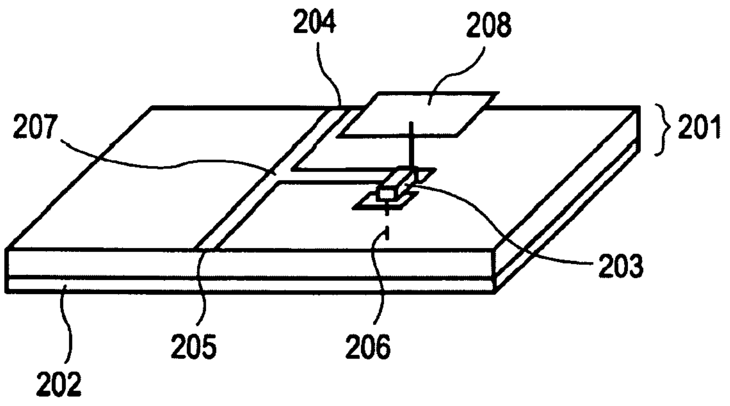
FIG. 14 illustrates an EFC antenna in which an impedance matching portion is constituted by a lumped-constant circuit.
Figure 15:
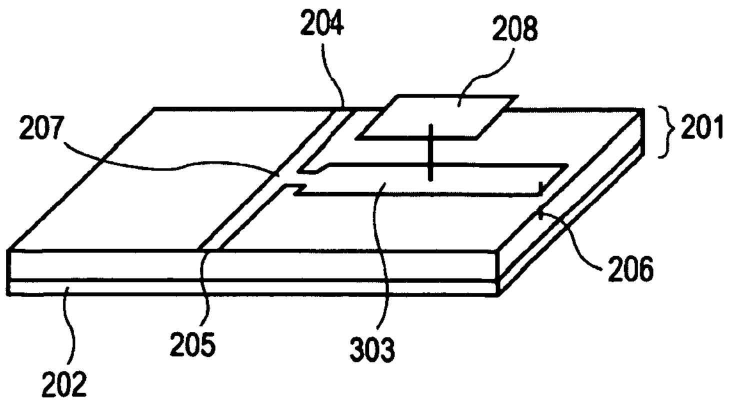
FIG. 15 illustrates an EFC antenna in which an impedance matching portion is constituted by a distributed-constant circuit.

FIG. 13 illustrates comparison of frequency characteristics of EFC antennas, in which impedance matching portions are constituted by a lumped-constant circuit and a distributed-constant circuit, respectively. In the EFC antenna in which a lumped-constant circuit is used as an impedance matching portion, as illustrated in FIG. 14, a coupling electrode 208 is provided at an end of a signal line pattern on a printed circuit board 201 via a metal line, a parallel inductor 203 is mounted at the end of the signal line pattern, and one end of the parallel inductor 203 is connected to a ground conductor 202 via a through hole 206 extending in the printed circuit board 201. On the other hand, in the EFC antenna in which a distributed-constant circuit is used as an impedance matching portion, as illustrated in FIG. 15, the coupling electrode 208 is provided at the center of a stub 303, having a length of λ/2, on the printed circuit board 201 via a metal line, and the stub 303 is connected to the ground conductor 202 via the through hole 206 extending in the printed circuit board 201 at the end of the stub 303. In each of the EFC antennas, the operating frequency is adjusted around 3.8 GHz. Also, in each of FIGS. 14 and 15, an RF signal is transmitted from a first port 204 toward a second port 205 through a microstrip line 207, and the EFC antenna is placed at a middle of the microstrip line 207. The frequency characteristic of each EFC antenna is measured as a transmission characteristic from the first port 204 to the second port 205. The result of the measurement is illustrated in FIG. 13.

The EFC antenna can be regarded as an open end when it is not coupled with another EFC antenna, and thus an RF signal input from the first port 204 is not supplied to the EFC antenna and is transmitted to the second port 205. Thus, around 3.8 GHz, which is the operating frequency of the EFC antenna, the value of propagation loss $S_{21}$ indicating the strength of a signal transmitted from the first port 204 to the second port 205 is large in the both EFC antennas. However, in the EFC antenna illustrated in FIG. 14, the value of $S_{21}$ is significantly small at frequencies deviating from the operating frequency. On the other hand, in the EFC antenna illustrated in FIG. 15, a favorable characteristic is maintained with a large value of $S_{21}$ over a wideband with the operating frequency at the center. It is clear from this comparison result that the EFC antenna effectively operates over a wideband by using a distributed-constant circuit for the impedance matching portion.

Figure 16A:
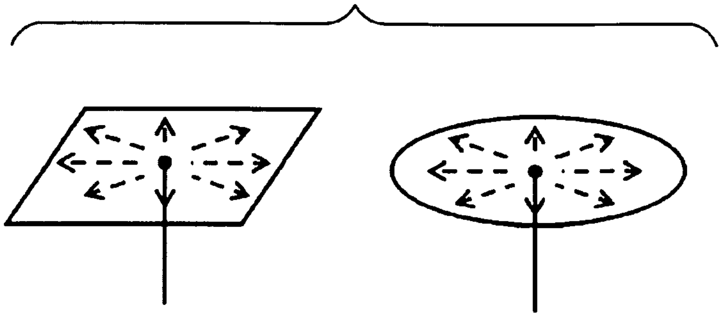
FIG. 16A illustrates a state where a radio frequency transmission path connects to the center of a coupling electrode.
Figure 16B:
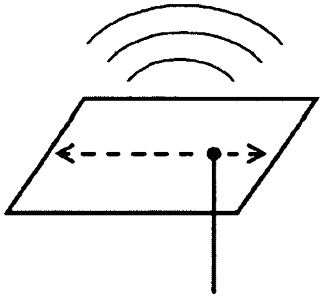
FIG. 16B illustrates a state where a radio frequency transmission path connects to a position deviating from the center of a coupling electrode and uneven current flows in the coupling electrode.

Referring back to FIG. 11, the coupling electrode 108 is connected via the metal line 107 near the center of the stub 103. Preferably, the metal line 107 is connected at almost the center of the coupling electrode 108. The reason is as follows. That is, when the RF transmission line is connected at the center of the coupling electrode, current evenly flows in the electrode and unnecessary radio waves are not radiated in the direction substantially vertical to the surface of the electrode in front of the electrode (see FIG. 16A). However, when the RF transmission line is connected at a position deviating from the center of the coupling electrode, uneven current flows in the coupling electrode and the coupling electrode operates as a microstrip antenna to radiate unnecessary radio saves (see FIG. 16B).

Figure 17:
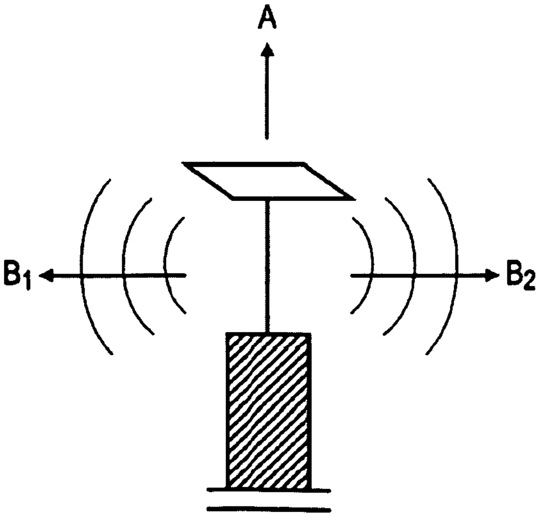
FIG. 17 illustrates an example of a configuration of a capacity-loaded antenna in which a metal element is attached to an end of an antenna element to provide capacity so as to reduce the height of the antenna.

Also, a "capacity loaded" antenna illustrated in FIG. 17 is widely known in the field of radio wave communication. In the capacity loaded antenna, a metal element is attached to an end of an antenna element so as to obtain capacity, so that the height of the antenna is reduced. The structure of this antenna is seemingly similar to that of the EFC antenna illustrated in FIG. 4. Now, a difference between the EFC antenna used in the transmitter and receiver in this embodiment and the capacity loaded antenna is described.

The capacity loaded antenna illustrated in FIG. 17 radiates radio waves in directions $B_1$ and $B_2$ around a radiation element of the antenna. On the other hand, direction A is a null direction in which no radio waves are radiated. Electrical fields generated around the antenna include a radiated electrical field that attenuates in inverse proportion to the distance from the antenna, an inductive electrical field that attenuates in inverse proportion to the square of the distance from the antenna, and an electrostatic field that attenuates in inverse proportion to the third power of the distance from the antenna. The inductive electrical field and the electrostatic field steeply attenuate in accordance with the distance compared to the radiated electrical field, and thus only the radiated electrical field is discussed in an ordinary radio system, whereas the inductive electrical field and electrostatic field are ignored in many cases. In the capacity loaded antenna illustrated in FIG. 17, an inductive electrical field and an electrostatic field are generated in direction A, but those fields are quickly attenuated in the air and are not actively used in radio wave communication.

The above description has been made about the configuration of the EFC antenna used in each of the transmitter and receiver in the noncontact communication system using electrical field coupling in an electrostatic field or an inductive electrical field in a short communication range. If the coupling electrodes are ideally designed, generation of unnecessary radio waves can be suppressed and reception of external radio waves can be prevented. This is also applied to a noncontact communication system using magnetic field coupling in an inductive magnetic field between coupling coils.

However, it is actually difficult to design an RF circuit to completely suppress a radiated electrical field. Even a communication apparatus that is originally designed for electrical field coupling emits or receives unnecessary radio waves due to trivial mismatch in the circuit or a current flowing in the ground.

For example, in the EFC antenna illustrated in FIG. 11, a sufficient distance is required between the stub 103 on a circuit mounting surface of the printed circuit board 101 and the coupling electrode 108 connected via the metal line 107 in order to avoid electrical field coupling between the ground conductor 102 and the coupling electrode 108 and to ensure an effect of electrical field coupling with the EFC antenna on the receiver side. However, if the distance between the circuit mounting surface and the coupling electrode 108 is too long, the metal line 107 extending between the printed circuit board 101 and the coupling electrode 108 functions as an antenna, and unnecessary radio waves are emitted due to a current flowing in the antenna.

For example, assuming that input power to the EFC antenna is 100%, 10% of the power may be radiated as radio waves. As described above, radio waves generated by a radiated electrical field propagate to a remote site compared to an electrostatic field and an inductive electrical field, and thus an effect on/from an external electronic apparatus is great.

For the above-described reason, in the communication system according to the embodiment of the present invention, an inverse effect on another electronic apparatus and a malfunction caused by external disturbing radio waves are prevented by suppressing electromagnetic waves emitted from a radio apparatus. For this purpose, a distributed-constant circuit is used for the impedance matching portion and the resonant portion of the EFC antenna to realize a wideband, and a mechanism to suppress transmission/reception of unnecessary radio waves is introduced by providing a radio wave absorber in the EFC antenna.

It is effective to use a radio wave absorber to suppress a radiated electrical field that propagates to a remote site and that has a great effect between electronic apparatuses. When a radio wave absorber is regarded as a distributed-constant circuit in RF, distributed series resistance R (Ω/m) and distributed parallel conductance G (S/m) play a role of absorbing energy. Here, the distributed series resistance R corresponds to μ" representing an imaginary part of complex permeability, and the distributed parallel conductance G corresponds to the sum of ∈" representing an imaginary part of complex permittivity and a calculation result obtained by dividing conductivity a by angular frequency ω, that is, $\in''+\sigma/\omega$. The radio wave absorber can be classified into a magnetic loss material based on complex permeability μ", a dielectric loss material based on complex permittivity ∈", and a conductive loss material based on conductivity σ, in accordance with a material constant carrying loss.

The magnetic loss μ" occurs when a spin carrying magnetism in a magnetic material delays with respect to change of an RF magnetic field. An example of a magnetic material in which such magnetic loss is caused includes ferrite, having high permeability. The dielectric loss ∈" occurs when a dipole having a dielectric performance delays with respect to change of an RF electrical field. The conductive loss σ occurs when a current having the same phase as that of an electrical field flows and when energy of electromagnetic waves is transformed to heat. Incidentally, in an RF region, radio wave absorption by dielectric loss and that by conductive loss are not distinguished from each other, and both of them may be defined as dielectric loss. An example of the dielectric loss material is resin, such as urethane foam or styrol, impregnated with carbon.

Figure 27:
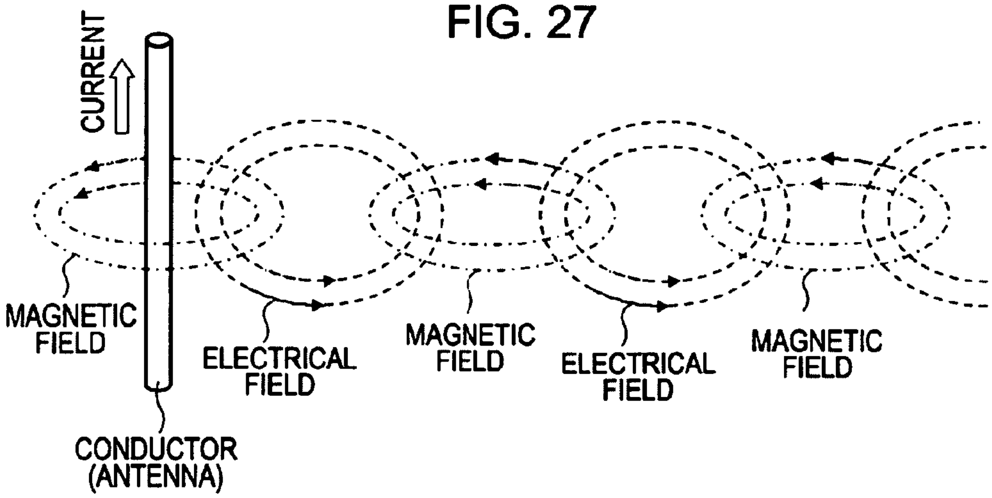
FIG. 27 illustrates a state where flow of current in a conductor, such as an antenna, causes generation of a magnetic field around the conductor, thereby causing generation of an electrical field, and further causing generation of a magnetic field.
Figure 28:
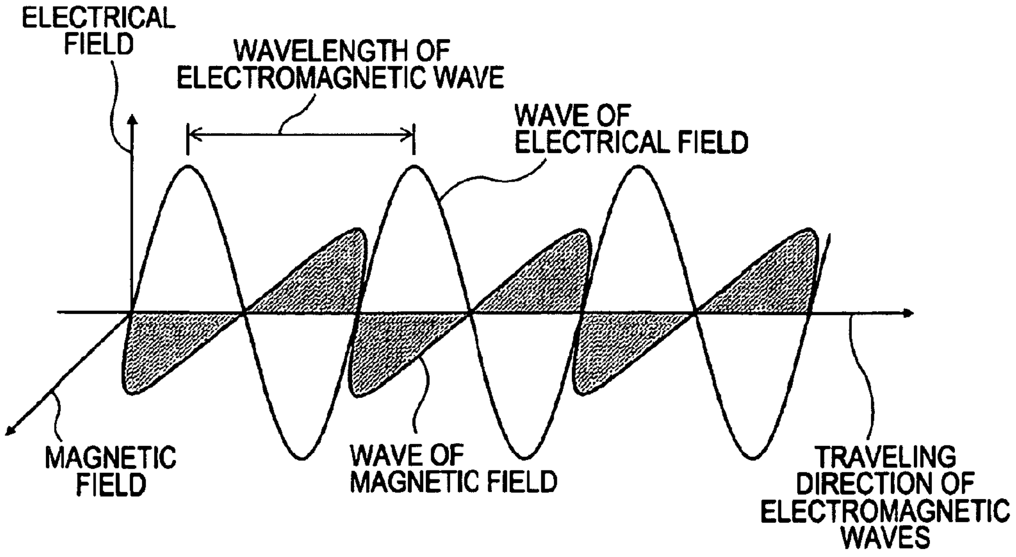
FIG. 28 illustrates a state where waves of electrical and magnetic fields interact with each other like a chain and travel in a traveling direction of waves while maintaining an orthogonal relationship.

The radio waves are "waves of an electrical field" and "waves of a magnetic field" sequentially propagating in the air. The waves of an electrical field and the waves of a magnetic field interact with each other like a chain and travel in the traveling direction of waves while maintaining an orthogonal relationship (see FIGS. 27 and 28). That is, the radio waves include waves of both electrical and magnetic fields. Thus, by suppressing the waves of one of the fields, the waves of the other field also significantly attenuate and the propagation thereof can be suppressed.

It is believed that the magnetic loss material can absorb radio waves by causing loss of magnetic field waves and destructing an interaction with electrical field waves, but that the magnetic loss material does not affect an electrical field including an electrostatic field and an inductive electrical field. Thus, in this embodiment, a magnetic loss material to mainly absorb and attenuate a magnetic field is placed as a radio wave absorber near the coupling electrode of the EFC antenna. For example, a magnetic material such as ferrite can be applied as a radio wave absorber.

Due to the magnetic loss material placed near the coupling electrode, a magnetic field component in electromagnetic waves is lost. As a result, unnecessary radio waves generated by the coupling electrode and disturbing radio waves coming from the outside are absorbed. An inductive magnetic field is also lost, but electrical field coupling in an electrostatic field or an inductive electrical field with the EFC antenna on the other end is not affected. Thus, in the noncontact communication system using electrical field coupling as illustrated in FIG. 1, radiation of unnecessary radio waves and an effect of disturbing radio waves coming from the outside can be suppressed, and stable data transmission can be performed by electrical field coupling in an electrostatic field in a short range.

Also, the following modification can be applied. In a noncontact communication system using magnetic field coupling, in which a transmitter and a receiver include coils that couple with each other in an inductive magnetic field and noncontact communication is performed in a short range by magnetic coupling, the coupling coils may be placed inside a dielectric loss material or on the surface thereof.

As described above, the radio waves are "waves of an electrical field" and "waves of a magnetic field" sequentially propagating in the air. It is believed that the dielectric loss material can absorb radio waves by causing loss of electrical field waves and destructing an interaction with magnetic field waves, but that the dielectric loss material does not affect a magnetic field including an inductive magnetic field. Thus, a dielectric loss material to mainly absorb and attenuate an electrical field is placed as a radio wave absorber near the coupling coil of the EFC antenna. For example, resin, such as urethane foam or styrol, impregnated with carbon can be applied as a radio wave absorber.

Due to the dielectric loss material placed near the coupling coil, an electrical field component in electromagnetic waves is lost. As a result, unnecessary radio waves generated by the coupling coil and disturbing radio waves coming from the outside are absorbed. Electrical fields such as an electrostatic field and an inductive electrical field are also lost, but magnetic field coupling in an inductive magnetic field with the EFC antenna on the other end is not affected. Thus, in the noncontact communication system using magnetic field coupling, radiation of unnecessary radio waves and an effect of disturbing radio waves coming from the outside can be suppressed, and stable data transmission can be performed by magnetic field coupling in an inductive magnetic field in a short range.

Hereinafter, descriptions are given about a specific example of a case where a magnetic loss material is used for a coupling electrode of an EFC antenna to perform noncontact communication by using electrical field coupling.

Figure 18:
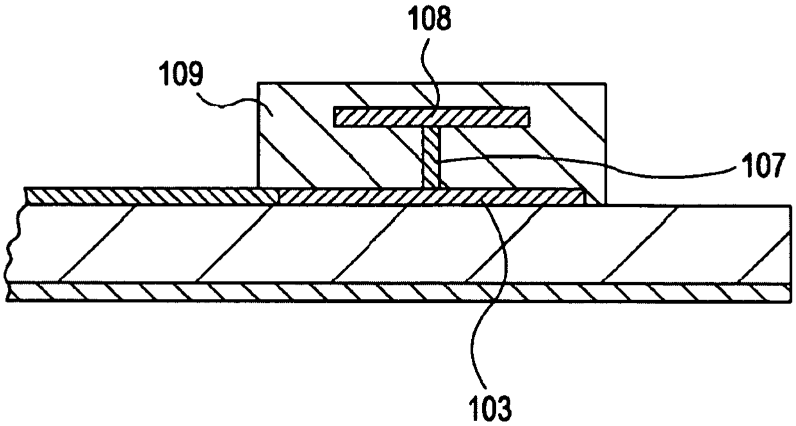
FIG. 18 illustrates an example of a configuration in which a magnetic loss material is placed near the coupling electrode of the EFC antenna illustrated in FIG. 11.

FIG. 18 illustrates an example of a configuration in which a magnetic loss material 109 is placed near the coupling electrode 108 of the EFC antenna illustrated in FIG. 11. As illustrated, by covering the coupling electrode 108, the metal line 107, and the resonant portion (stub) 103 with the magnetic loss material 109, radiation of unnecessary radio waves and an effect of external noise can be suppressed.

Figure 19:
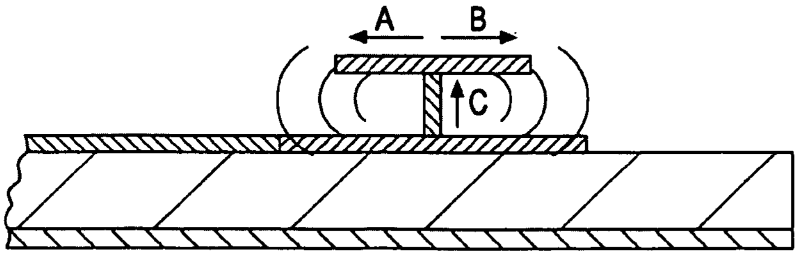
FIG. 19 illustrates radio waves generated in the EFC antenna.

Now, currents flowing in the coupling electrode 108 are specifically discussed. When the center of the coupling electrode is connected to the resonant portion (stub) via the metal line, current A and current B of opposite directions flow from the center of the coupling electrode toward the outside, as illustrated in FIG. 19. Radio waves generated by currents A and B have also opposite directions and cancel each other, so that no radio waves are radiated. On the other hand, current C flows in the metal line connecting the coupling electrode and the resonant portion, toward the coupling electrode. Any current of opposite direction to current C does not flow. That is, current C flowing in the metal line is not cancelled, which is a cause of generation of unnecessary radio waves.

On the other hand, in this embodiment, the magnetic loss material 109 is provided to cover the metal line 107, as illustrated in FIG. 18. With this configuration, propagation of magnetic field waves that are generated when current passes through the metal line 107 can be suppressed. As a result, generation of radio waves can be suppressed.

Figure 20:
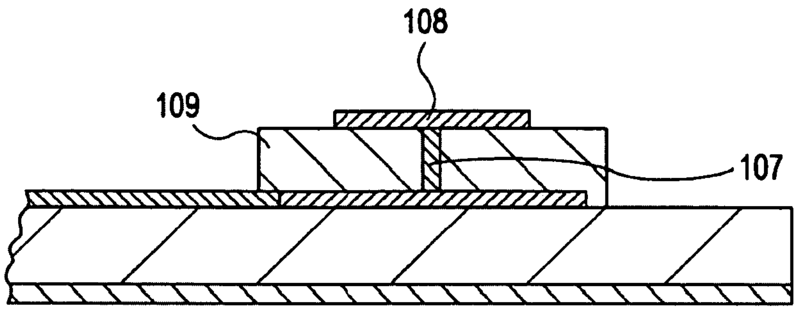
FIG. 20 illustrates an example of the configuration of the EFC antenna in which the magnetic loss material is removed from the surface of the coupling electrode.

As a modification of the EFC antenna illustrated in FIG. 18, the magnetic loss material 109 may be removed from the surface of the coupling electrode 108, as illustrated in FIG. 20. As described above with reference to FIG. 19, when the metal line 107 connects to the coupling electrode 108 at the center thereof, currents flowing in the coupling electrode 108 cancel each other and radio waves are not generated (see FIG. 16A), and thus the coupling electrode 108 need not be covered with the magnetic loss material 109. In this configuration, the distance between two coupling electrodes communicating with each other can be reduced. Accordingly, the electrical field intensity can be increased and communication quality can be enhanced.

Figure 21:
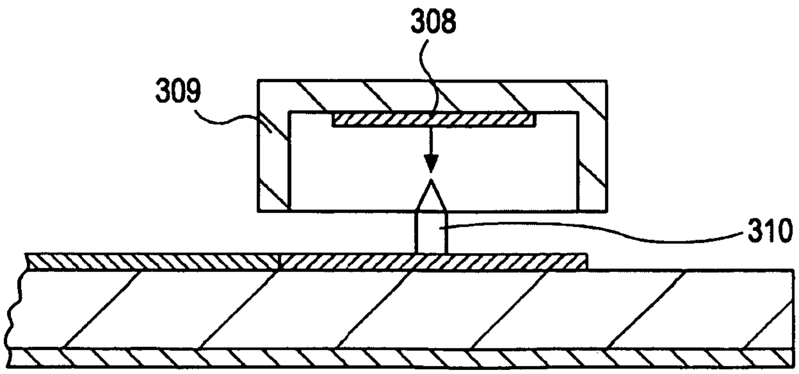
FIG. 21 illustrates another example of the configuration of the EFC antenna in which a magnetic loss material is placed near the coupling electrode.

FIG. 21 illustrates another example of the configuration of the EFC antenna in which a magnetic loss material is placed near the coupling electrode. In this example, a stub having a length of λ/2 and serving as a resonant portion is formed as a printed pattern on the printed circuit board, and a conductive pin 310 serving as a metal line is protruded at almost the center of the stub. On the other hand, a casing made of a magnetic loss material 309 has a depth almost equal to the height of the pin 310. A coupling electrode 308 is formed by plating or the like on the bottom of the casing. The casing is connected to the printed circuit board at the edge of an opening of the casing (to accommodate the pin 310 in the casing). At that time, the connecting position is determined so that the end of the pin 310 is in contact with almost the center of the coupling electrode 308. The magnetic loss material 309 of the casing is mounted on the printed circuit board by a process such as reflow soldering.

Figure 22:
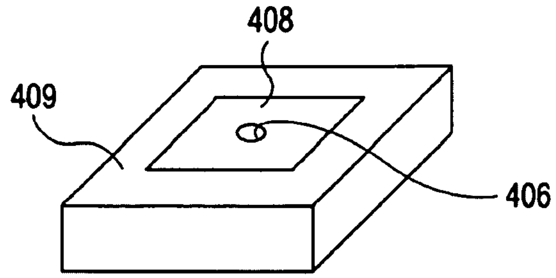
FIG. 22 illustrates another example of the configuration of the EFC antenna in which a magnetic loss material is placed near the coupling electrode.
Figure 23:
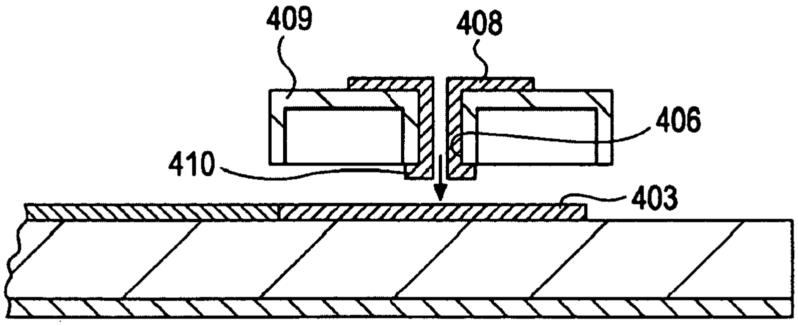
FIG. 23 illustrates another example of the configuration of the EFC antenna in which a magnetic loss material is placed near the coupling electrode.

FIGS. 22 and 23 illustrate still another example of the configuration of the EFC antenna in which a magnetic loss material is placed near the coupling electrode.

As illustrated in FIG. 22, in a magnetic loss material 409 in a shape of square prism having an appropriate height, a through hole 406 extends therethrough. A conductive pattern, formed by deposition or the like, is placed on the upper surface of the magnetic loss material 409 and on an inner periphery of the through hole 406. The conductive pattern on the upper surface serves as a coupling electrode 408, the conductive portion on the inner periphery of the through hole 406 serves as a metal line for supplying current, and the conductive portion at the lower end of the through hole 406 serves as a connecting terminal 410 for a resonant portion serving as a stub 403. As in the above-described example, the stub 403 having a length of λ/2 and serving as a resonant portion is formed as a printed pattern on the printed circuit board, and the magnetic loss material 409 is positioned so that the connecting terminal 410 is in contact with almost the center of the stub 403. The magnetic loss material 409 is mounted on the printed circuit board by a process such as reflow soldering. Alternatively, the magnetic loss material 409 may be hollow, as illustrated in FIG. 23.

Figure 24:
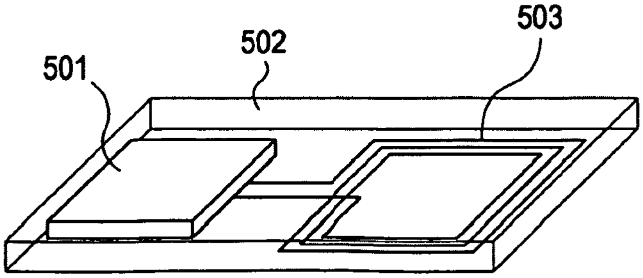
FIG. 24 illustrates an example of a configuration of a radio apparatus in which a dielectric loss material is placed near a coil used for magnetic field coupling.

The noncontact communication system using electrical field coupling has been described above. An effect of a magnetic loss material on an electrode to perform electrical field coupling is the same as an effect of a dielectric loss material on a coupling coil to perform magnetic field coupling. Therefore, by covering a coupling coil 503, connected to a transmitting/receiving circuit 501, with a dielectric loss material 502 as illustrated in FIG. 24, it can be prevented that electromagnetic waves generated by a radio apparatus inversely affect another electronic apparatus, and also a malfunction caused by disturbing radio waves coming from the outside can be prevented.

In the above description, a mechanism to transmit/receive signals between a pair of EFC antennas in a noncontact communication system using electrical field coupling has been described. Transmission/reception of signals between two apparatuses inevitably causes transfer of energy, and thus this type of communication system can be applied to power transmission. As described above, the electrical field component $E_R$ generated by the EFC antenna on the transmitter side propagates as surface waves in the air. The receiver side rectifies and stabilizes signals received by the EFC antenna thereof so as to extract power.

Figure 25:
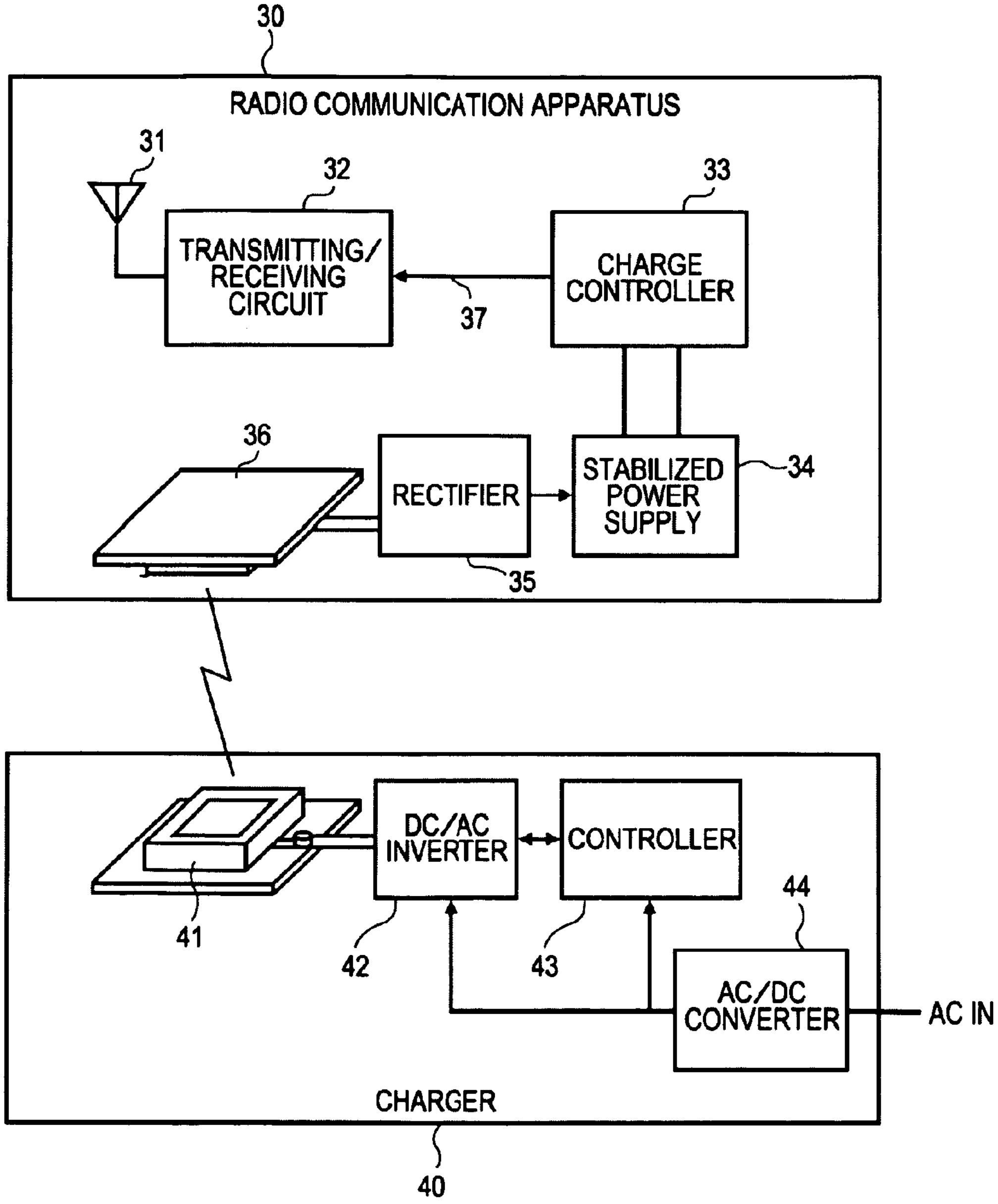
FIG. 25 illustrates an example of a configuration in which the communication system using EFC antennas illustrated in FIG. 1 is applied to power transmission.

FIG. 25 illustrates an example of a configuration in a case where the communication system using EFC antennas is applied to power transmission.

In the system illustrated in FIG. 25, a radio communication apparatus 30 includes an antenna 31, a transmitting/receiving circuit 32, a charge controller 33, a stabilized power supply 34, a rectifier 35, a power receiving EFC antenna 36, and a power line 37. On the other hand, a charger 40 includes a power transmitting EFC antenna 41, a DC/AC inverter 42, a controller 43, and an AC/DC converter 44.

In this system, by placing the radio communication apparatus 30 near the charger 40 connected to an AC power supply, power transmission and charge to the radio communication apparatus 30 are performed in a noncontact manner via the EFC antennas 41 and 36. Note that the EFC antennas 41 and 36 are used only for power transmission.

When the power receiving EFC antenna 36 does not exist near the power transmitting EFC antenna 41, most part of the power input to the power transmitting EFC antenna 41 is reflected and returns to the DC/AC inverter 42 side, and thus radiation of unnecessary radio waves can be suppressed. Also, a small amount of radio waves leaking from a metal line connected to the center of a coupling electrode is absorbed by a magnetic loss material provided around the coupling electrode, so that leakage of radio waves can be suppressed more effectively. When noncontact power transmission is performed, a transmission output is typically larger than output power for communication, and thus suppression of leakage of radio waves is strictly required.

An example of charging a radio communication apparatus has been described with reference to FIG. 25. However, the charged side is not limited to the radio communication apparatus, and noncontact power transmission may be performed on a music player or a digital camera, for example.

Figure 26:
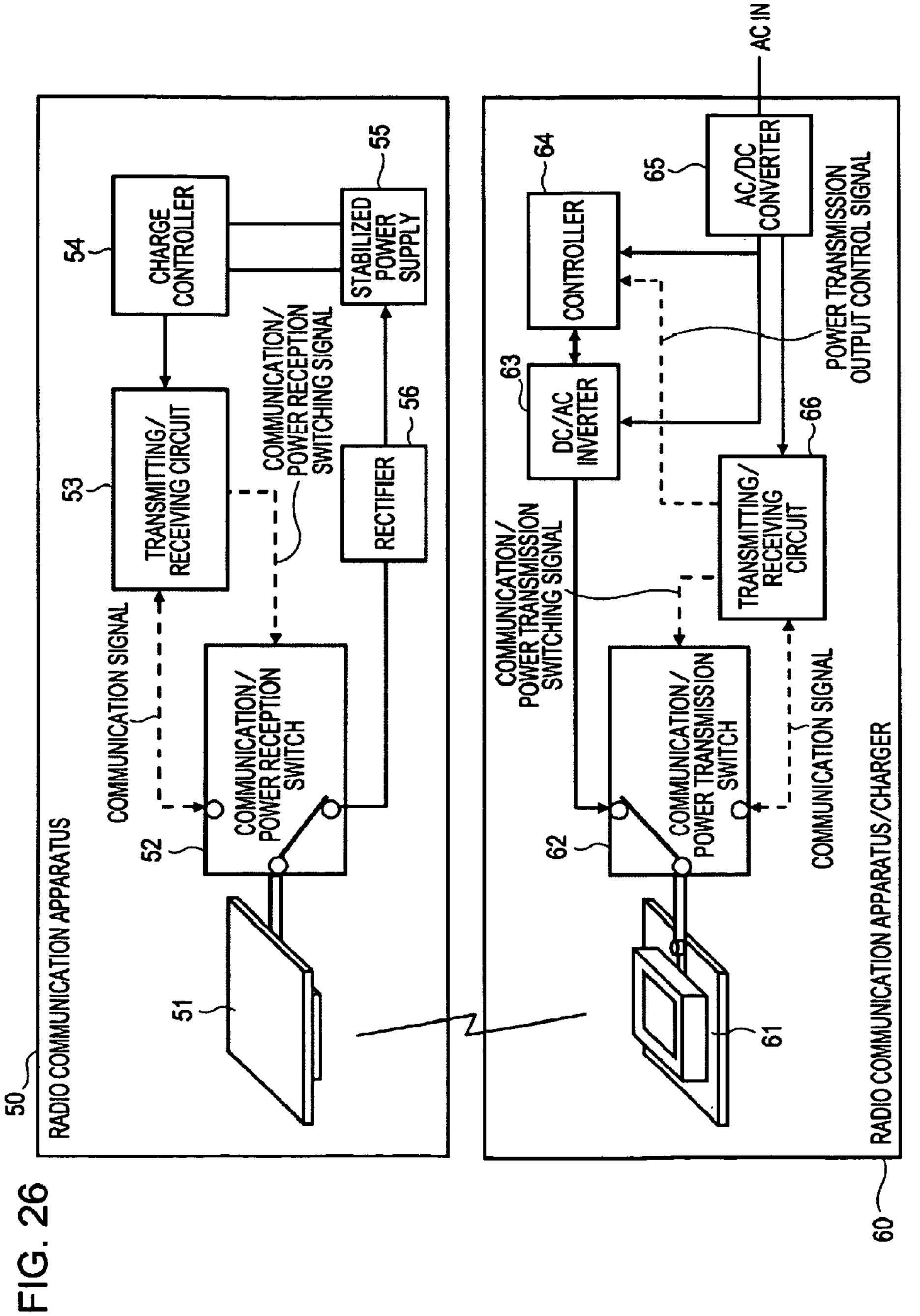
FIG. 26 illustrates another example of the configuration in which the communication system using EFC antennas illustrated in FIG. 1 is applied to power transmission.

FIG. 26 illustrates another example of the configuration in the case where the communication system using EFC antennas is applied to power transmission. In the system illustrated in FIG. 26, EFC antennas and a surface wave transmission line are used for both power transmission and communication.

Specifically, a radio communication apparatus 50 includes an EFC antenna 51 for power reception and communication, a communication/power reception switch 52, a transmitting/receiving circuit 53, a charge controller 54, a stabilized power supply 55, and a rectifier 56. On the other hand, a radio communication apparatus/charger 60 includes an EFC antenna 61 for power transmission and communication, a communication/power transmission switch 62, a DC/AC inverter 63, a controller 64, an AC/DC converter 65, and a transmitting/receiving circuit 66.

Timings to perform communication and power transmission (reception) are switched by using a communication/power transmission (reception) switching signal transmitted from the transmitting/receiving circuits 53 or 66. For example, switching between communication and power transmission (reception) may be performed at predetermined intervals. At this time, output of power transmission can be optimally maintained by adding a charge state to a communication signal and feeding it back to the charger side. For example, after charging has completed, the information thereof may be transmitted to the charger side and output of power transmission may be set to 0.

In the system illustrated in FIG. 26, the charger 60 connects to an AC power supply. Alternatively, the system may be used for supplying power to a mobile phone of which battery starts to run out from another mobile phone.

The present invention has been described above with reference to a specific embodiment. However, it is obvious that those skilled in the art can carry out a modification or an alternative of the embodiment without deviating from the scope of the present invention.

In this specification, the embodiment about a communication system for data transmission to transmit UWB signals through electrical field coupling without using a cable has been mainly described. However, the present invention is not limited to this communication system. The present invention can also be applied to a communication system using RF signals other than the UWB communication method or a communication system to perform data transmission through electrical field coupling by using signals of a relatively low frequency, for example.

In this specification, the embodiment about a communication system to perform noncontact communication through electrical field coupling between electrodes facing each other has been mainly described. However, the present invention can also be applied to a communication system that includes a transmitter and a receiver including coils coupled with each other in an inductive magnetic field and that performs noncontact communication through magnetic coupling in a short range. In this system, stable noncontact communication can be realized while suppressing an inverse effect of unnecessary radio waves on another system and a malfunction caused by disturbing radio waves coming from the outside.

In this specification, the embodiment about a system to perform data communication between a pair of EFC antennas has been mainly described. Since transmission of signals between two apparatuses inevitably causes transfer of energy, such a communication system can be of course applied to power transmission.

The embodiment of the present invention has been disclosed as an example, and the content of this specification should not be interpreted in a limited manner. The following claims should be considered to determine the scope of the present invention.

What is claimed is:

1. A communication system comprising:

a transmitter including a transmitting circuit to generate radio frequency signals for transmitting data and a first electrical field coupling antenna to transmit the radio frequency signals as an electrostatic field or an inductive electrical field; and a receiver including a second electrical field coupling antenna and a receiving circuit to perform a reception process on radio frequency signals received by the second electrical field coupling antenna, wherein each of the first and second electrical field coupling antennas includes:

a plate coupling electrode, a resonant portion to strengthen electrical coupling between the plate coupling electrodes, a connection portion located in a substantial center position of the resonant portion and connecting the plate coupling electrode and the resonant portion, and a radio wave absorber placed near the coupling electrode, wherein the radio wave absorber covers at least a surface of the plate coupling electrode or the connection portion; and wherein the radio frequency signals are transmitted as an electric-field longitudinal wave component through electrical field coupling between the plate coupling electrodes of the first and second electrical field coupling antennas, the plate coupling electrodes facing each other.

2. The communication system according to claim 1, wherein the radio frequency signals are ultrawideband signals using an ultrawideband.

3. The communication system according to claim 1, wherein the resonant portion constitutes a bandpass filter to pass a desired radio frequency band between the electrical field coupling antennas of the transmitter and the receiver.

4. The communication system according to claim 1, wherein the resonant portion includes a distributed-constant circuit.

5. The communication system according to claim 1, wherein the radio wave absorber is composed of a magnetic loss material, magnetic loss being given to the magnetic loss material due to delay of a spin, carrying magnetism, with respect to change of a radio frequency magnetic field, and wherein the radio wave absorber suppresses generation of a magnetic field in radio waves that travel by waves of alternate magnetic and electrical fields, in order to suppress propagation of radio waves generated from the electrical field coupling antenna or to prevent reception of radio waves coming from the outside to the electrical field coupling antenna.

6. The communication system according to claim 1, wherein the coupling electrode is disposed inside the radio wave absorber or on a surface of the radio wave absorber.

7. A communication apparatus comprising:

a communication circuit to process radio frequency signals for transmitting data; and an electrical field coupling antenna used for electrical field coupling with another communication apparatus facing the communication apparatus in a short range, wherein the electrical field coupling antenna includes a plate coupling electrode, a resonant portion to strengthen electrical coupling between the plate coupling electrode and a coupling electrode of the other communication apparatus, a connection portion connecting the plate coupling electrode and the resonant portion, and a radio wave absorber placed near the coupling electrode, wherein the connection portion is located in a substantial center position of the resonant portion and the radio wave absorber covers at least a surface of the plate coupling electrode or the connection portion; and wherein the radio frequency signals are transmitted as an electric-field longitudinal wave component through electrical field coupling in an electrostatic field or an inductive electrical field between the electrical field coupling antenna and an electrical field coupling antenna of the other communication apparatus.

8. The communication apparatus according to claim 7, wherein the radio frequency signals are ultrawideband signals using an ultrawideband.

9. The communication apparatus according to claim 7, wherein the resonant portion constitutes a bandpass filter to pass a desired radio frequency band between the electrical field coupling antennas of the communication apparatus and the other communication apparatus.

10. The communication apparatus according to claim 7, wherein the resonant portion includes a distributed-constant circuit.

11. The communication apparatus according to claim 7, wherein the radio wave absorber is composed of a magnetic loss material, magnetic loss being given to the magnetic loss material due to delay of a spin, carrying magnetism, with respect to change of a radio frequency magnetic field, and wherein the radio wave absorber suppresses generation of a magnetic field in radio waves that travel by waves of alternate magnetic and electrical fields, in order to suppress propagation of radio waves generated from the electrical field coupling antenna or to prevent reception of radio waves coming from the outside to the electrical field coupling antenna.

12. The communication apparatus according to claim 7, wherein the coupling electrode is disposed inside the radio wave absorber or on a surface of the radio wave absorber.

13. The communication apparatus according to claim 7, wherein the radio wave absorber covers a surface of the plate coupling electrode, a surface of the connection portion, and a surface of the resonant portion.

14. The communication apparatus according to claim 7, wherein the plate coupling electrode has a first surface covered by the radio wave absorber and a second surface exposed from the radio wave absorber, the second surface being opposite to the first surface.

* * * * *